United States Patent
Brown et al.

(10) Patent No.: US 8,282,760 B2
(45) Date of Patent: Oct. 9, 2012

(54) APPARATUS AND PROCESS FOR WRAPPING AND SECURING EDGE FLAPS OF FLEXIBLE COVER SHEET TO PANEL STRUCTURE

(75) Inventors: Ronald H. Brown, Holland, MI (US); Larry Snyder, Holland, MI (US)

(73) Assignee: Haworth, Inc., Holland, MI (US)

( * ) Notice: Subject to any disclaimer, the term of this patent is extended or adjusted under 35 U.S.C. 154(b) by 227 days.

(21) Appl. No.: 12/802,611

(22) Filed: Jun. 10, 2010

(65) Prior Publication Data

US 2011/0303350 A1   Dec. 15, 2011

(51) Int. Cl.
| | |
|---|---|
| B32B 3/04 | (2006.01) |
| B32B 37/00 | (2006.01) |
| B29C 65/00 | (2006.01) |
| B31B 1/60 | (2006.01) |
| B31F 1/00 | (2006.01) |
| A61F 13/15 | (2006.01) |

(52) U.S. Cl. .......... 156/216; 156/60; 156/196; 156/199; 156/200; 156/201; 156/202; 156/204

(58) Field of Classification Search ............ 156/60, 156/196, 199, 200, 201, 202, 204, 216
See application file for complete search history.

(56) References Cited

U.S. PATENT DOCUMENTS

| | | |
|---|---|---|
| 2,808,099 A | 10/1957 | Silverman |
| 3,840,167 A | 10/1974 | Otteman et al. |
| 4,248,657 A | 2/1981 | Henry |
| 4,995,178 A | 2/1991 | Randolph |
| 5,072,496 A | 12/1991 | Radermacher |
| 5,118,374 A * | 6/1992 | Suwitoadji ............. 156/216 |
| 5,129,569 A | 7/1992 | Stanton |
| 5,230,687 A | 7/1993 | Lombardo et al. |
| 5,258,083 A * | 11/1993 | Monk et al. ............. 156/64 |
| 5,259,825 A | 11/1993 | De Angelis et al. |
| 6,581,260 B2 | 6/2003 | Kinney |
| 6,951,592 B2 | 10/2005 | McConnell et al. |
| 7,225,852 B2 | 6/2007 | McConnell et al. |
| 7,614,196 B2 | 11/2009 | McConnell et al. |
| 2007/0214625 A1 | 9/2007 | Brown et al. |

* cited by examiner

*Primary Examiner* — Christopher Schatz
*Assistant Examiner* — Matthew Hoover
(74) *Attorney, Agent, or Firm* — Flynn, Thiel, Boutell & Tanis, P.C.

(57) ABSTRACT

A process for wrapping an edge flap of a workpiece having a covering sheet extending over a front face thereof and edge flaps protruding outwardly beyond the front face. The workpiece is positioned on a table, with one edge and the protruding flap overhanging and protruding outwardly beyond the table. The workpiece is disposed in proper location by positioning elements and clamps fix it to the table. adhesive is applied to the edge flap. A wrapping arrangement is provided with wiping blades so that upward movement of the wiping arrangement causes a first wiping blade to engage the edge flap and wipe it upwardly into engagement with an edge face, following which the wiping arrangement moves the second blade over the workpiece so that a second wiping blade engages the end part of the flap and wipes it downwardly into engagement with the back face of the workpiece.

6 Claims, 18 Drawing Sheets

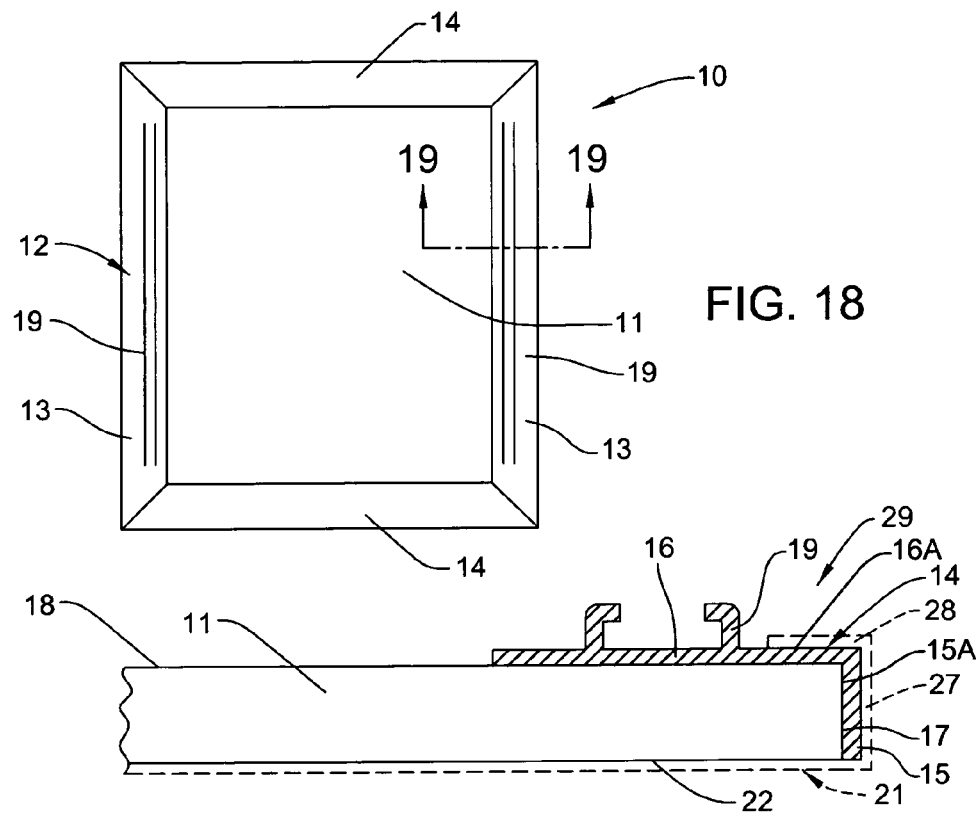
FIG. 18
FIG. 19
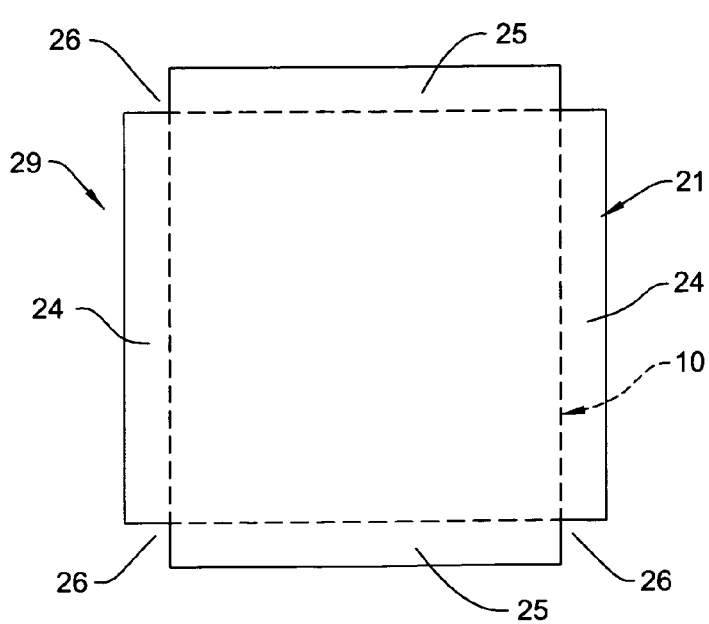
FIG. 20

APPARATUS AND PROCESS FOR WRAPPING AND SECURING EDGE FLAPS OF FLEXIBLE COVER SHEET TO PANEL STRUCTURE

FIELD OF THE INVENTION

This invention relates to an apparatus and process for wrapping edge flaps of a thin flexible covering sheet around the edges of a substrate, such as a panel-shaped structure, for defining a cover pad or panel for an upright wall or similar structure.

BACKGROUND OF THE INVENTION

Wall systems defined by upright space-dividing panels are widely utilized in offices and the like to divide large open areas into smaller workspaces. Such panels, which may be of floor-to-ceiling height or of lesser height, are typically prefabricated and employ a rigid frame to which side cover pads are attached for enclosing the frame and defining the desired aesthetics of the finished wall panel. The cover pads, which may extend the full vertical height of the frame, or which may be a plurality of smaller pads which attach to the frame, typically include a sheet-like or plate-like substrate which is exteriorly covered by a thin flexible covering sheet to provide desired functionality with respect to aesthetics, acoustics and the like. Such covering sheet frequently constitutes a thin flexible fabric, vinyl or foil-like material which is secured to the pad substrate so that the cover sheet defines the exposed or front side surface of the assembled wall panel. While constructions of this type are conventionally utilized, the construction of such panels and specifically the application of a thin flexible covering sheet to the pad substrate has long been an undesirably inefficient and costly process requiring a high degree of manual labor and manipulation in order to ensure that the flexible covering sheet is properly attached to its underlying substrate in a manner which ensures proper alignment of the covering sheet while at the same time avoiding undesired looseness, puckering or wrinkling.

In the construction of upholstered pads or panels, as aforesaid, the substrate in one conventional construction is defined by a thin panel-like core pad which for example may be defined by a compressed mat of fiberglass, either with or without a supporting backer, and in another known construction the core pad may be defined by a rigid plate-like member constructed of a material such as fiberboard or plasterboard. Further, the core pad is typically provided with a rigid ring-shaped rectangular frame fixed to and surrounding the core pad, which frame extends along the peripheral edges of the pad and typically wraps around the backface adjacent the edges. The frame is typically contoured to accommodate clips or fasteners which mount the pad to a wall panel frame. The flexible covering sheet which extends across the front face of the pad is typically manually wrapped around the side edges of the pad and frame (i.e. the substrate) to permit adhesive securement of covering sheet edge portions (i.e. flaps) to the side edges and rear face of the substrate. As noted above, this is a time consuming and hence costly manual assembly process.

In an effort to improve on the manually intensive labor associated with cover pads provided with flexible covering sheets as discussed above, the Assignee hereof has developed and is utilizing an apparatus which employs opposed side rollers for effecting folding and pressing of adhesive-coated edge flaps of the covering sheet around opposite lengthwise-extending edges of the pad or panel. While this apparatus, as disclosed in co-pending U.S. Ser. No. 11/369,171, has been successfully adopted for folding and securing edge flaps of a covering sheet to the back sides and/or edges of panels and pads, nevertheless this apparatus possesses structural and operational characteristics which are not optimally suited for all panel or pad constructions. More specifically, in some panel constructions, the rigid edge frame members defining the panel frame have fasteners or ribs which protrude outwardly from the rear surface thereof and positioned in close but inwardly spaced relation from the edge surface of the panel. Wrapping an edge flap around the edge surface and onto the back surface, and then effecting proper adhesive securement thereof to the back surface, is difficult since the pressing rollers of the above-described apparatus are incapable of effecting pressing of the edges of the cover sheet flaps into corners adjacent the protruding fasteners or ribs. In addition, the rollers associated with the above-described apparatus typically simultaneously cooperate with opposed edges to effect holding of the panel during the pressing of the opposite edge flaps, particularly since the movement of the rollers upwardly and then over onto the back face prevents or greatly restricts proper clamping of the panel since engaging top clamps to the edge frame members is effectively prohibited due to the clearance space required by the pressing rollers. This known apparatus, as described above, hence possesses operational characteristics which are either not suited or inconvenient for use with certain panel constructions, particularly those employing a rearwardly protruding rib or fastener associated with the back surface of the frame and spaced inwardly a relatively small distance from the adjacent edge surface.

Accordingly, it is an object of this invention to provide an improved apparatus, and related process, which facilitates and at least partially automates the wrapping and securing of flexible edge flaps of a covering sheet to a pad or panel, and which specifically enables such wrapping and securing to be carried out with pads or panels having protrusions associated with the back side of the frame while enabling the edge flap to be properly wrapped and adhesively secured both to the side edge surface and the back surface up to a point closely adjacent the rearward protrusion, thereby overcoming deficiencies and disadvantages associated with the apparatus disclosed in the aforementioned '369 application.

In the apparatus of the present invention, there is provided a table-like support adapted to support a panel-shaped substrate thereon. The substrate is already partially assembled in that a flexible covering sheet has already been positioned over and secured to the front side or front face of the substrate, and the covering sheet has edge flaps which are cantilevered outwardly beyond each of the edge faces of the substrate. The substrate also typically has edge frame members which are secured to the substrate core and wrap around the edge faces and a part of the back face, with the back face of the frame member having a rib or fastener protruding outwardly at a location close to but spaced inwardly a small distance from the respective edge face. A positioning structure is disposed above the table, specifically for cooperation with one corner thereof, and is movable into a lowered position wherein positioning elements such as pins are disposed for contacting two sides, namely first and second perpendicularly-oriented edge faces of the substrate when it is positioned on the table with the covering sheet facing downwardly. The positioning elements are positioned at an elevation slightly above the elevation of the table top surface so that the edge flaps can protrude outwardly beneath the positioning elements. When the substrate is positioned in contact with the positioning elements so as to be properly oriented on the support table, in which position edges of the substrate slightly overhang the respective edges of the table, a clamping system disposed above the table is activated so that clamps move downwardly and engage the frame along the first and second sides of the substrate to hold it in stationary engagement with the table. The positioning elements are then retracted upwardly into their home or storage position. A movable carrier positioned adjacent the first side of the table is then moved from a home position adjacent one end of said first side to a displaced position adjacent the other end of said first side, and is then moved back to its home position. During this movement a spray assembly mounted on the carrier is activated to discharge a desired coating of adhesive onto the protruding edge flap as well as the adjacent edge and back surfaces of the edge frame member as the spray system moves lengthwise therealong. When the carrier returns to its home position, a wiping assembly which is positioned adjacent and extends lengthwise along the first edge, is moved upwardly so that a first generally horizontally protruding wiping blade, which is oriented to protrude toward the side edge of the table and hence the edge face of the substrate, engages the flap and wipes it upwardly into contact with the edge face. After the wiping assembly moves the first wiping blade upwardly beyond the edge flap, which now protrudes upwardly beyond the respective edge face of the substrate, the wiping assembly is then moved generally horizontally inwardly so that a second wiping blade, which protrudes generally vertically downwardly, contacts the protruding upper portion of the edge flap and wipes it downwardly into engagement with the back surface of the frame member. The configuration of the second blade and its inward movement enables the edge flap to be wiped securely into contact with the back surface to a point closely adjacent the upwardly protruding rib. The wiping assembly is then retracted outwardly and lowered downwardly back into its home position. The movable carrier is then again moved back and forth along the first edge of the table, and a roller assembly mounted thereon is activated by being extended inwardly so that rollers thereof engage both the edge and back surfaces of the panel to effect pressing of the edge flap into secure contacting engagement with the respective frame surfaces.

In the improved apparatus, as aforesaid, there is preferably additionally provided substantially identical carrier and wiping structures associated with the second edge of the table, which structures are sequentially activated in the same manner as the structures associated with the first edge so as to permit wrapping and securing of the edge flap associated with the second edge of the substrate. The second edge wrapping process is normally initiated after or just shortly prior to completion of the wrapping process associated with the first edge. After the first and second edges have both been wrapped and adhesively secured to the respective frame members, then the clamping system is deactivated in that the clamps are retracted upwardly to release the substrate. The substrate on which two edges have already been wrapped can either be removed and replaced by a further substrate, or in the alternative the substrate can be rotated horizontally 180 degrees so as to permit wrapping and securing of the remaining two edge flaps.

In the apparatus as aforesaid, the wiping blades are preferably plate-like members constructed of an elastomeric or rubber-like material having limited flexibility, with the protruding or cantilevered outer tip edge preferably being slightly rounded and having limited elastic deflectability so as to be capable of engaging the edge flap and pushing it into snug contacting and hence adhesive engagement with the underlying frame surface, while at the same time avoiding undesired frictional contact and possibly damaging surface contact with the covering sheet. The wiping blade, particularly when oriented generally vertically and moved horizontally so as to engage the flap for pressed engagement against the upward-facing back face, enables the edge part of the flap to be pressed snugly downwardly into contact with the back face at a location closely adjacent a corner defined with the upwardly protruding rib, thereby maximizing the contact area between the edge flap and the back surface, and greatly minimizing the possibility of the edge portion of the edge flap being free and unsecured.

This invention also relates to a process for securing the edge flaps to the substrate, specifically a process corresponding generally to the operations carried out by the apparatus as briefly discussed above, and as described in greater detail hereinafter.

Other objects and purposes of the invention will be apparent to persons familiar with constructions of this general type upon reading the following specification and inspecting the accompanying drawings.

BRIEF DESCRIPTION OF THE DRAWINGS

FIG. 18 is a plan view showing the back side of a panel substrate, prior to application of the covering sheet to the front face thereof.

FIG. 19 is an enlarged fragmentary sectional view taken generally along line 19-19 in FIG. 18 and illustrating the frame member as associated with the panel substrate, and also illustrating by dotted lines the cover sheet as applied thereto.

FIG. 20 is a plan view showing a front side of the panel substrate with the cover sheet applied thereto, and edge flaps protruding outwardly, prior to the flaps being wrapped and secured in the folded position illustrated by dotted lines in FIG. 19.

Figure 1:
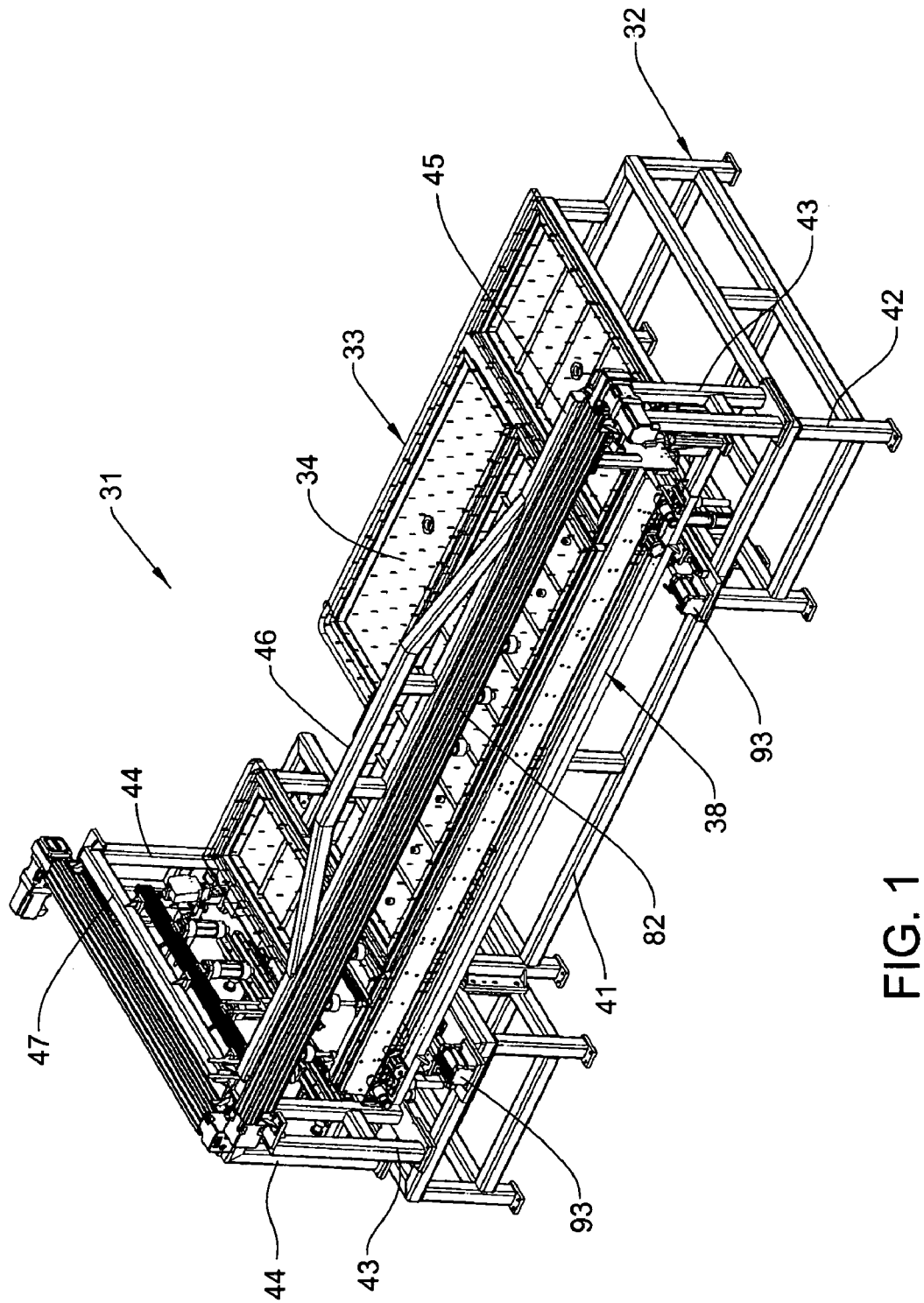
FIG. 1 is an upper back side perspective view of an apparatus for wrapping and securing edge flaps of a covering sheet to a panel substrate in accordance with the present invention.
Figure 2:
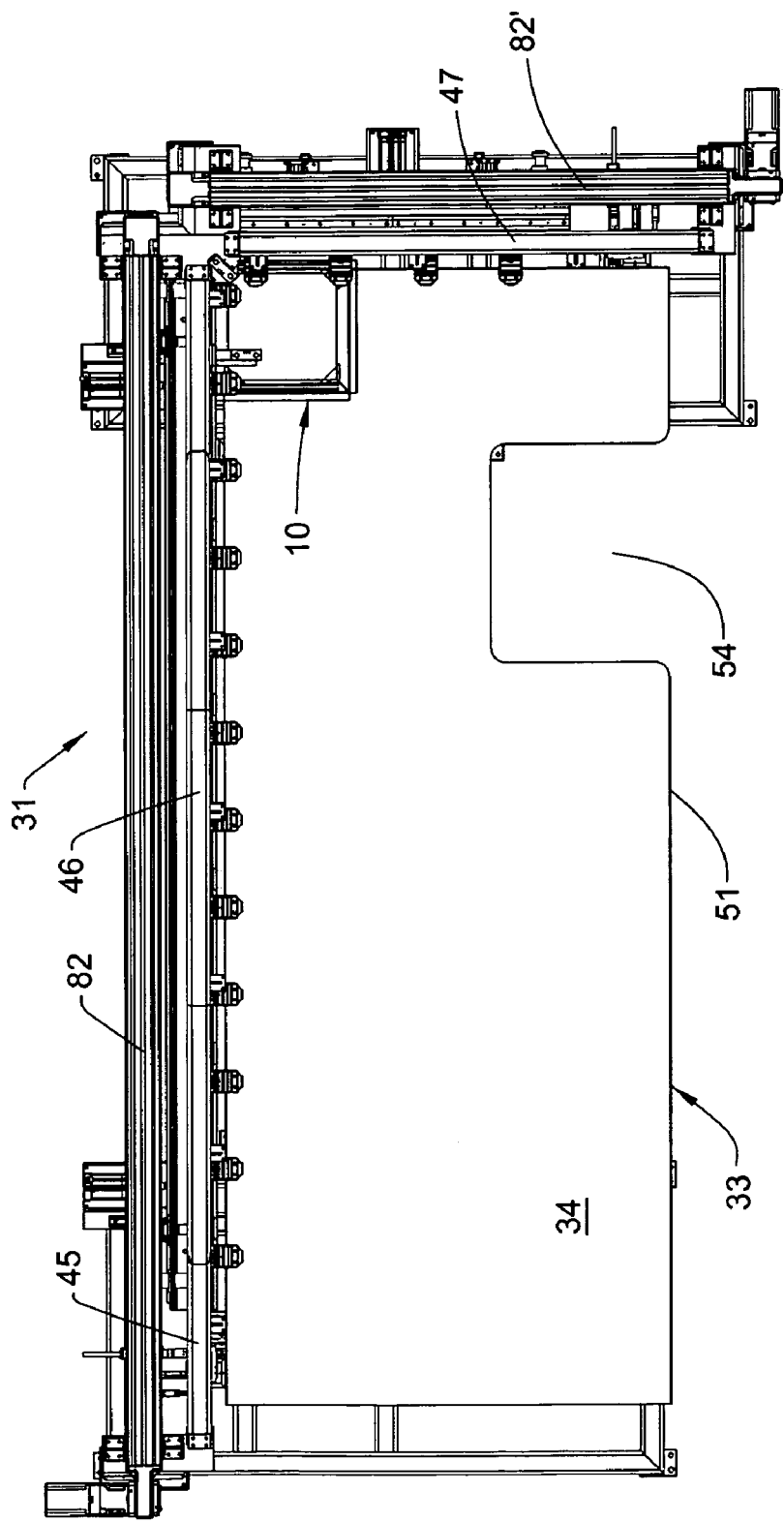
FIG. 2 is a top view of the apparatus shown in FIG. 1.

Certain terminology will be used in the following description for convenience and reference only, and will not be limiting. For example, the words "upwardly", "downwardly", "rightwardly", and "leftwardly" will refer to directions in the drawings to which reference is made. The words "inwardly" and "outwardly" will refer to directions towards and away from the geometric center and of the apparatus or panel, and designated parts thereof. The word "front" will refer to the exterior side of the panel or substrate which faces outwardly when the panel is mounted on its frame, and the word "rear" will refer to the opposite side of the panel or substrate. Said terminology will include the words specifically mentioned, derivatives thereof, and words of similar import.

DETAILED DESCRIPTION

Referring initially to FIGS. 18-20, there is illustrated one embodiment of a known workpiece or substrate 10 which is used for forming an upholstered article such as a pad or panel structure 21, typically for attachment to a frame structure for defining an upright space-dividing wall.

The workpiece or substrate 10 includes a generally stiff or fairly rigid core 11 which has a sheet-like or plate-like configuration defined by rather large front and back sides, with the core 11 having a thickness which is small in comparison to its other (i.e. length and width) dimensions. The core 11, which may comprise a wall board panel, is supported by and surrounded by a rigid ring-shaped frame 12 defined by generally parallel side frame elements 13 which extend along one pair of opposite sides of the core, with the side frame elements 13 being rigidly joined by generally parallel elongate side frame elements 14 which extend along the remaining parallel sides of the core. The elongate side frame elements 13 and 14, in the illustrated arrangement, have a generally L or angle-shaped cross-section which, as illustrated by FIG. 19, includes short and long legs 15 and 16, respectively, which project in generally perpendicular relationship with one another. The long leg 16 overlies the rear face 18 of the core, whereas the short leg 15 overlies the edge face 17 of the core. The leg 17 terminates substantially flush with the front face 22 of the core.

At least one of the pairs of frame elements 13 and 14 are also provided with protrusions 19 which are rigidly joined to and are cantilevered outwardly away from the exposed back surface of the leg 16. The protrusion 19, which in the illustrated embodiment is similar to a rib which is elongated lengthwise of the frame element, cooperates with a fastener (not shown) associated with a frame to facilitate mounting of the panel member 21 onto a supporting frame.

The workpiece or substrate 10 is in turn provided with a large, thin, flexible covering sheet 21 positioned so as to extend entirely over the front face 22 of the substrate which, depending upon the overall construction associated with the panel structure, can be suitably secured, as by adhesive, to the front face 22 of the core. This covering sheet 21, as illustrated by FIG. 20, is sized so as to totally cover the front face 22, and in addition has edge flaps 24 and 25 which are sized to extend outwardly a predetermined distance beyond each respective edge of the front face. These edge flaps 24 and 25 extend throughout the length of each respective edge of the workpiece, with the adjacent edge flaps being separated at the corners of the workpiece by notches or cutouts 26 so as to eliminate excess material when the edge flaps are folded around the edges of the workpiece. The edge flaps 24 and 25, as illustrated by the dotted line position of the edge flap 25 in FIG. 19, is folded around the edge (i.e. corner) of the front face 22 through an angle of about 180 degrees so that an inner flap part 27 overlies and is adhesively secured to the exposed edge face 15A of the frame element leg 15, with the remainder of the flexible edge flap being folded around the rear corner of the frame member so that the terminal or outer flap part 28 overlies and is adhesively secured to the exposed back face 16A of the frame leg 16. In this regard, the flap is initially sized so that, when it is folded or wrapped around the edge as illustrated by dotted lines in FIG. 19, the terminal or free edge of the flap is positioned in close proximity to the protrusion 19 so as to permit maximum contact and adherement with the exposed back face of the frame, particularly since the protrusion 19 is normally spaced from edge face 15A by a small distance, such as about one-half to about five-eights inch, while at the same time avoiding any interference with the protrusion 19.

The covering sheet 21 is of conventional construction for use and applications of this type, and typically comprises a thin and flexible sheet material such as a textile (i.e. fabric), plastic, film or foil material. The material defining the covering sheet, however, generally possesses sufficient but limited stiffness so that the edge flaps 24 and 25, when the covering sheet is positioned and adhered to the front face of the core as illustrated in FIG. 20, will protrude outwardly in a somewhat cantilevered fashion, without being pulled significantly downwardly due to their own weight.

The assembled panel structure 29, such as illustrated by FIG. 19, is conventional, and a construction of a panel structure similar to this type is discussed in greater detail in U.S. Pat. No. 7,661,237, as owned by the assignee hereof. This known panel structure has, as briefly discussed above, utilized manual techniques for applying, folding and securing the covering sheets to the workpiece or substrate. To permit a more automated and efficient attachment of the cover sheet to the workpiece, the apparatus described hereinafter has been developed so as to facilitate the wrapping and securing of the edge flaps so as to permit forming of the panel structure 29 illustrated by FIG. 19 from a workpiece which is initially provided in a condition corresponding to that illustrated by FIG. 20.

Referencing now FIGS. 1-6, there is illustrated a machine or apparatus 31 which cooperates with a workpiece 10 having a flexible covering sheet secured to the front face thereof and provided with protruding edge flaps, substantially as illustrated by FIG. 20. The machine 31 effects folding and adhesive securement of the edge flaps around the edges of the workpiece so as to permit completion of the panel structure 29 substantially as illustrated by FIG. 19, as discussed above.

The apparatus 31, which will generally be referred to as an edge wrapping apparatus, includes a generally conventional support frame 32 for supporting thereon a generally horizontally enlarged support table 33, the latter defining thereon a horizontally enlarged, upward-facing top surface 34 for removably supporting a panel-like workpiece, as described hereinafter.

As to the general overall arrangement of the apparatus 31, the latter is provided with a positioning structure 35 associated generally with the right rear corner of the table 33 so as to permit proper positioning of a workpiece on the table, and a clamping structure 36 is associated with both the rear and right edges of the table for permitting clamping and hence holding of the workpiece on the table. The apparatus 31 in addition has, adjacent each of the back and right sides, an adhesive applicator 37 and a wiping arrangement 38 for permitting application of adhesive to the back surface of the edge flap, and then wiping (i.e. folding) of the flap into the folded and secured position illustrated by FIG. 19. The detailed construction and operation of the apparatus 31 will now be discussed below.

Regarding the frame 32, it is defined by a plurality of generally horizontally elongate beams 41 which are fixedly secured to and supported by upright beams 42 in a generally conventional manner to provide rigidity and support for the support table 33. The frame also includes, adjacent opposite ends of the rear edge 52 of the table, a pair of upright structures 43, and a similar pair of upright structures 44 are fixed to the frame and project upwardly adjacent opposite ends of the right or top edge 53 of the table. The uprights 43 adjacent the rear of the table are rigidly joined by a horizontally elongate top beam 45 which extends horizontally in upwardly spaced and generally parallel relationship to the support table. The beam 45 is disposed in the vicinity of and located upwardly above the rear edge 52 of the table. This top beam 45, due to its significant length, is preferably reinforced by a truss beam 46. A further top beam 47 is rigidly joined to and extends horizontally between upper ends of the uprights 44, with the top beam 47 being disposed generally upwardly from and in the vicinity of the front or right edge 53 of the table so that the beam extends generally parallel therewith. The top beams 45 and 47 have horizontally elongate support rails 48 and 49, respectively, fixed thereto and extending lengthwise thereal-ong to permit mounting thereon of the positioning structure 35 and clamping structure 36, as described hereinafter.

The support table 31, when supported on the frame and positioned relative to the top beams 45 and 47 described above, is positioned such that the rear or back edge 52 of the table is disposed generally vertically below the top beam 45, and the top or right edge 53 of the table is spaced vertically downwardly and generally below the other top beam 47. The front edge 51 of the table extends generally parallel with the back edge 52, and in the illustrated embodiment the table has a cut-out 54 which opens inwardly from the front edge 51 so as to permit an operator to more conveniently access the right rear corner of the table, particularly when the workpiece comprises a rather small panel, so as to make it easier for the operator to assist in positioning the workpiece on the table.

Considering now the positioning structure 35 which is associated with the apparatus 31, this structure 35 is positioned for cooperation with the right rear corner of the support table 33 to define a precise positioning location for the workpiece which is to be positioned on the table. The positioning structure 35 includes a rear edge positioning unit 56 which is suspended downwardly from the top rail 48 so as to project downwardly toward the rear edge of the table at a location which is spaced lengthwise a predetermined distance from the rear right corner of the table. The positioning unit 56, as diagrammatically illustrated in FIG. 9, includes a linear drive unit 63, such as a fluid pressure cylinder, which is supported on the rail 48 and projects downwardly therefrom, with a drive or piston rod 58 being movably extendable downwardly toward the table 33. The extendable rod 58, adjacent the lower end thereof, is provided with a carrier 59 to which is fixed a rear positioning element 61, the latter being generally a cylindrical pin which is vertically oriented and is cantilevered downwardly from the carrier 59. The rear positioning unit 56 is activatable into a lowermost position which, as illustrated by solid lines in FIG. 9, results in the pin 61 being spaced outwardly (i.e. rearwardly) from the adjacent rearward edge 52 of the table, with the lower free end of the pin 61 being positioned at an elevation which is a small distance above the table upper surface 34. The vertical spacing between the table surface 34 and the bottom surface of the pin 61, when the latter is in its lowered or extended position, is such as to enable the edge flap 24 associated with the covering on the workpiece 10 to freely project outwardly beyond the pin 61, but at the same time the pin 61 is spaced vertically above the table surface 34 by a distance which is less than the height (i.e. thickness) of the workpiece frame. This hence enables the edge surface of the workpiece frame to contact the side of the rear positioning pin 61 for properly locating the workpiece on the support table, while at the same time not interfering with the outward cantilevered projection of the edge flap on the covering sheet.

Figure 9A:
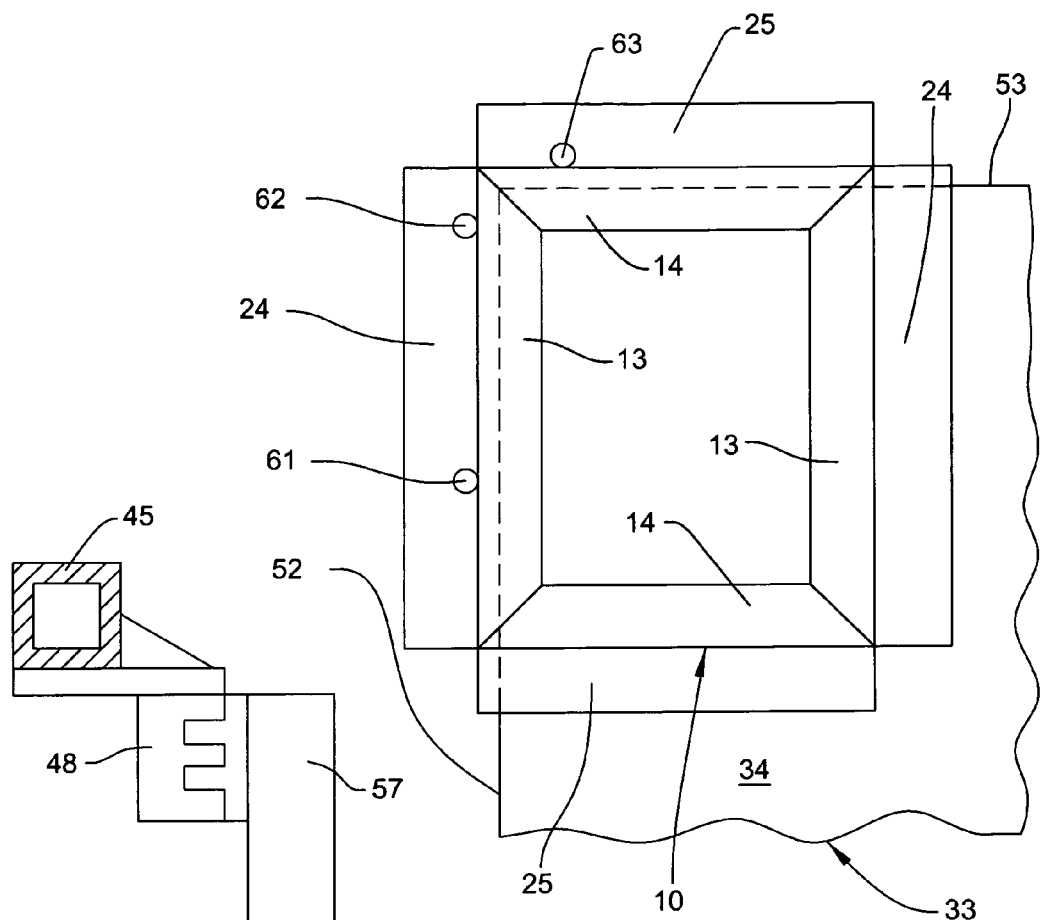
FIG. 9A is a diagrammatic plan view showing the relationship of the positioning pins to the support table, and the cooperation of a panel substrate therewith.
Figure 9:
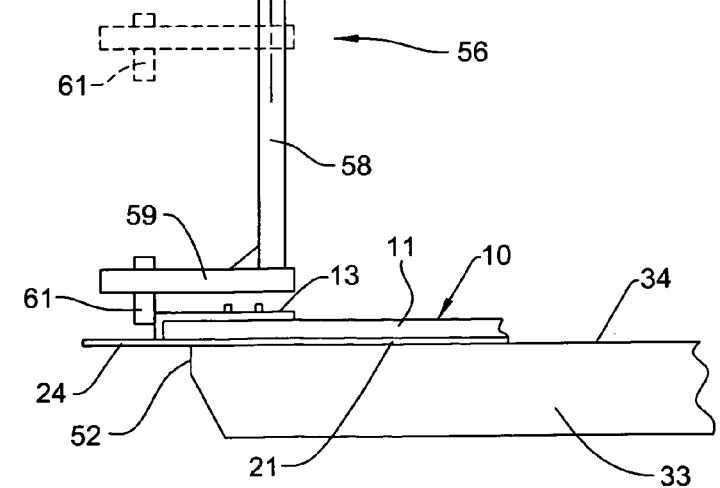
FIG. 9 is a diagrammatic elevational view of one of the positioning units for positioning the substrate on the table.

When the edge flap is being wrapped and secured (as described hereinafter), the activating drive unit 57 is retracted so as to maintain the positioning pin 61 in a raised storage position substantially as illustrated by dotted lines in FIG. 9.

In addition to the rear edge positioning unit 56 which is disposed for cooperation with the rear table edge 52 at a location spaced lengthwise from the right rear corner of the table, the positioning apparatus 35 preferably includes at least two additional positioning units identical to the unit 56 described above, one of the units being secured to and projecting downwardly from the top rail 48 so that its respective positioning pin 62 is located closely adjacent the right rear corner in outwardly spaced relation from the rear edge 52 of the table in the same manner as the pin 61 described above. The other positioning unit can also be generally identical to the unit 56 described above, and is mounted on and projects downwardly from the other top rail 49 in the vicinity of the right rear corner of the table so that its positioning pin 53 is positioned closely adjacent the corner but is spaced outwardly from and cooperates with the front or right edge 53 of the table. These three pins, as illustrated in FIG. 9A, hence define a right angle profile which corresponds with the right angle profile defined by the rear and right edges of the table and hence enable an operator (or an automatic positioning device if provided) to properly position a workpiece on the table so that perpendicular edges on the frame abut the three positioning pins, while at the same time the three pins, due to their upwardly-spaced relationship relative to the top surface of the table, enable the edge flaps 24 and 25 associated with the two frame edges to project outwardly generally as illustrated by FIGS. 9 and 9A. When the workpiece is disposed in contacting engagement with the plurality of positioning pins, the two perpendicular edges of the workpiece frame which are in contact with the pins are positioned in slight overhanging relationship relative to the table surface 34, as also diagrammatically illustrated in FIGS. 9 and 9A.

As an alternative to the use of two separate positioning units located at the corner and each having a separate driving cylinder, it will be appreciated that these two units can be consolidated so as to utilize a single driving cylinder, with the carrier associated with the free end of the piston rod having the pair of pins 62 and 63 provided thereon and projecting downwardly therefrom so that the pins 62 and 63 respectively cooperate with the rear and right edges of the table so as to define the desired right-angle relationship.

With the positioning arrangement hence employing a minimum of at least three contact pins disposed so that at least two of the pins define a straight line relationship along one edge (i.e. the rear) of the table, and at least one pin cooperates with the other transverse edge (i.e. the right side) of the table, the pins hence define a right-angle relationship in cooperation with the right rear corner of the table to permit proper disposition of the workpiece on the table so that, when the workpiece is clamped to the table in the manner described hereinafter, the two protruding edges of the workpiece and the respective protruding edge flaps are hence disposed for proper cooperation with the assemblies which apply adhesive and effect subsequent folding and securement of the edge flaps to the workpiece, as hereinafter described.

The disposition of the three locating pins relative to the table, and their cooperation with the workpiece, is diagrammatically illustrated in FIG. 9A.

Figure 10:
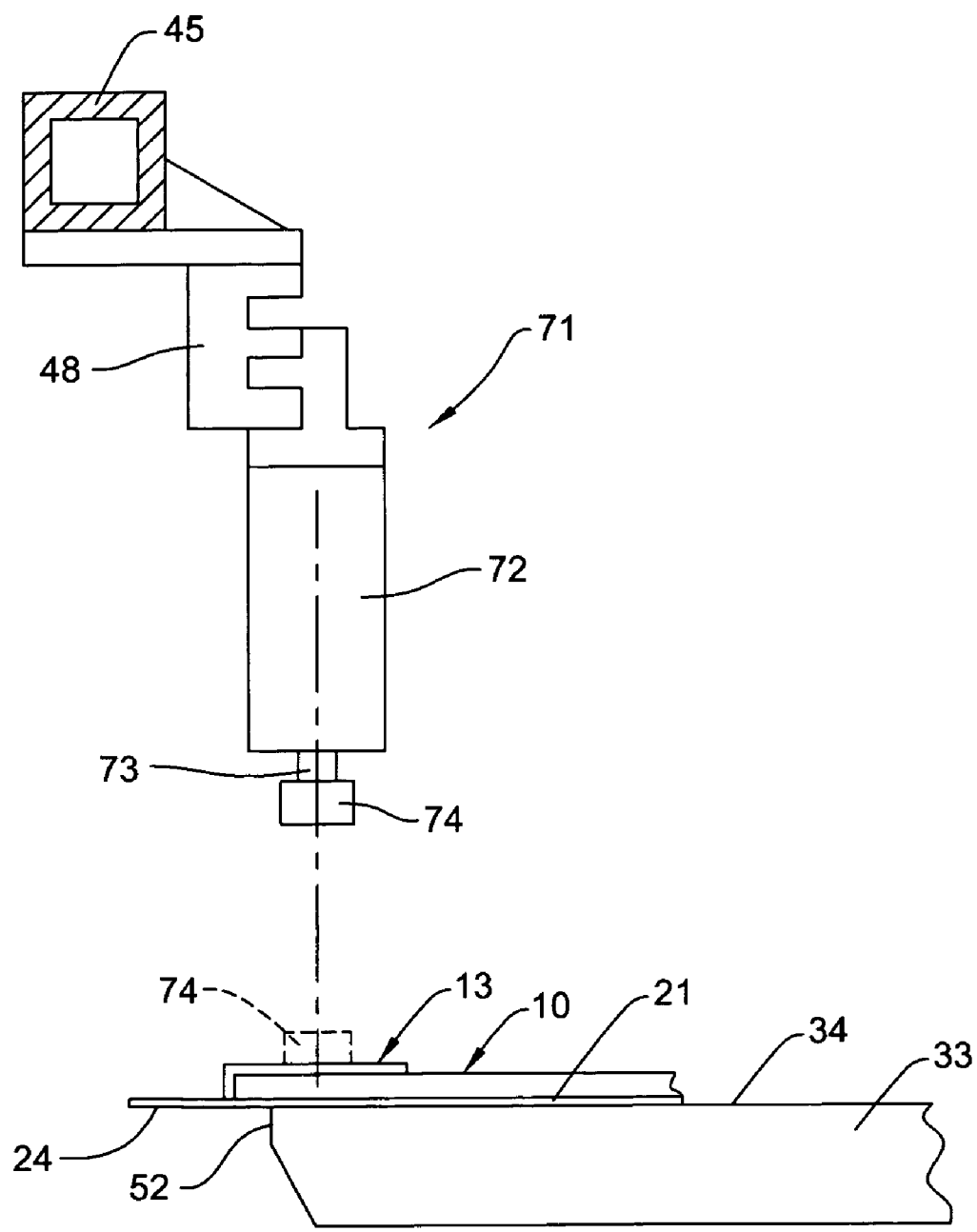
FIG. 10 is a diagrammatic elevational view illustrating one of the clamps in disengaged relationship relative to the panel substrate positioned on the table.

When a workpiece is positioned on the table 33 and properly located against the locating pins 61-63 as illustrated diagrammatically in FIG. 9A, the clamping structure 36 is activated so that several clamping units 71 are energized and extended downwardly to effect clamping engagement with two of the perpendicularly-joined edge rails of the workpiece, namely the frame rails which are positioned directly over and overhang the rear and right edges 52, 53 of the table, so as to clampingly hold the workpiece in stationary engaged relationship with the table. The individual clamping units 71, one of which is diagrammatically illustrated in FIG. 10, includes a driving device 72 such as a pneumatic cylinder which has its upper end mounted to the carrier rail 48 or 49. The cylinder 72 projects downwardly toward the table and is disposed so as to be positioned generally over the table adjacent one of the rear or right edges thereof. The rod 73 of the pressure cylinder 72 is extendable vertically downwardly and, at its lower end, carries a clamping pad which is preferably of a relatively stiff but deformable elastomeric material so as to permit it to snugly and fixedly engage the edge frame element 13 or 14 of the workpiece without damaging or marring same. This pad 74, when the cylinder 72 is activated and extending downwardly, is moved into snug downward clamping engagement with the frame rail of the workpiece at a location close to the respective table edge, substantially as illustrated by FIG. 10.

Figure 3:
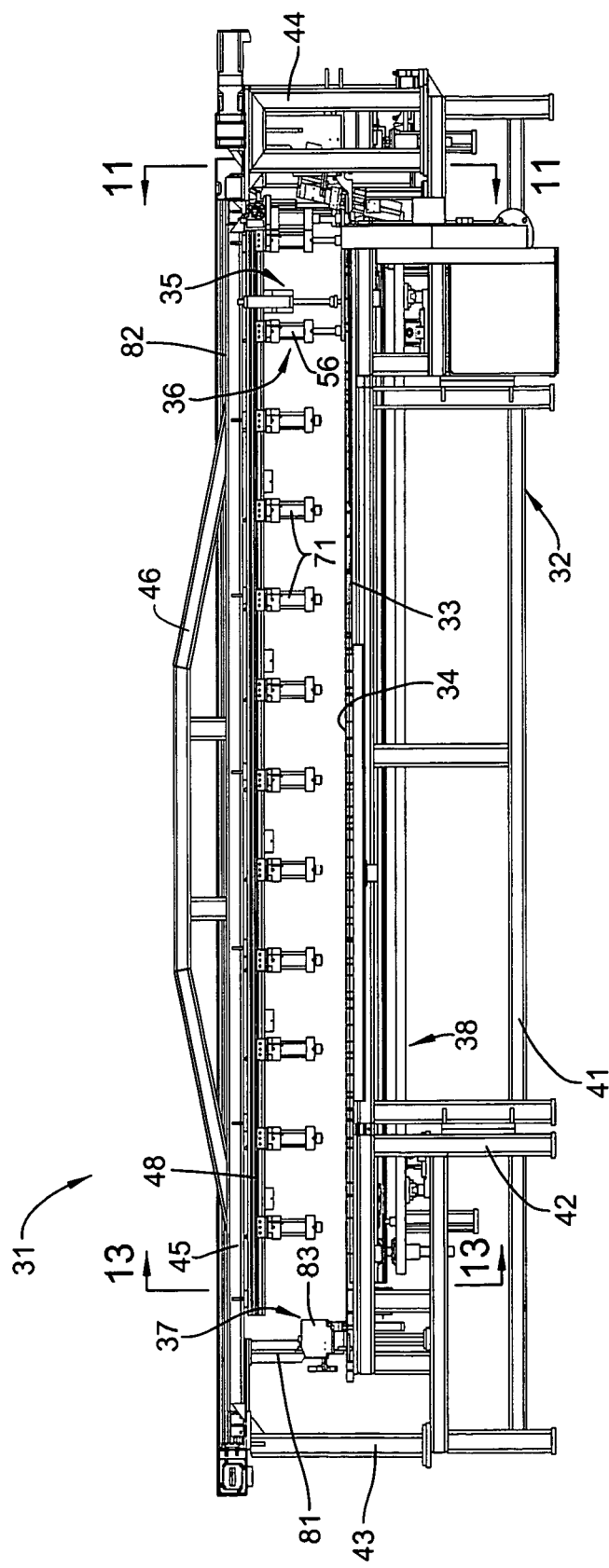
FIG. 3 is a front view of the apparatus shown in FIG. 2.
Figure 4:
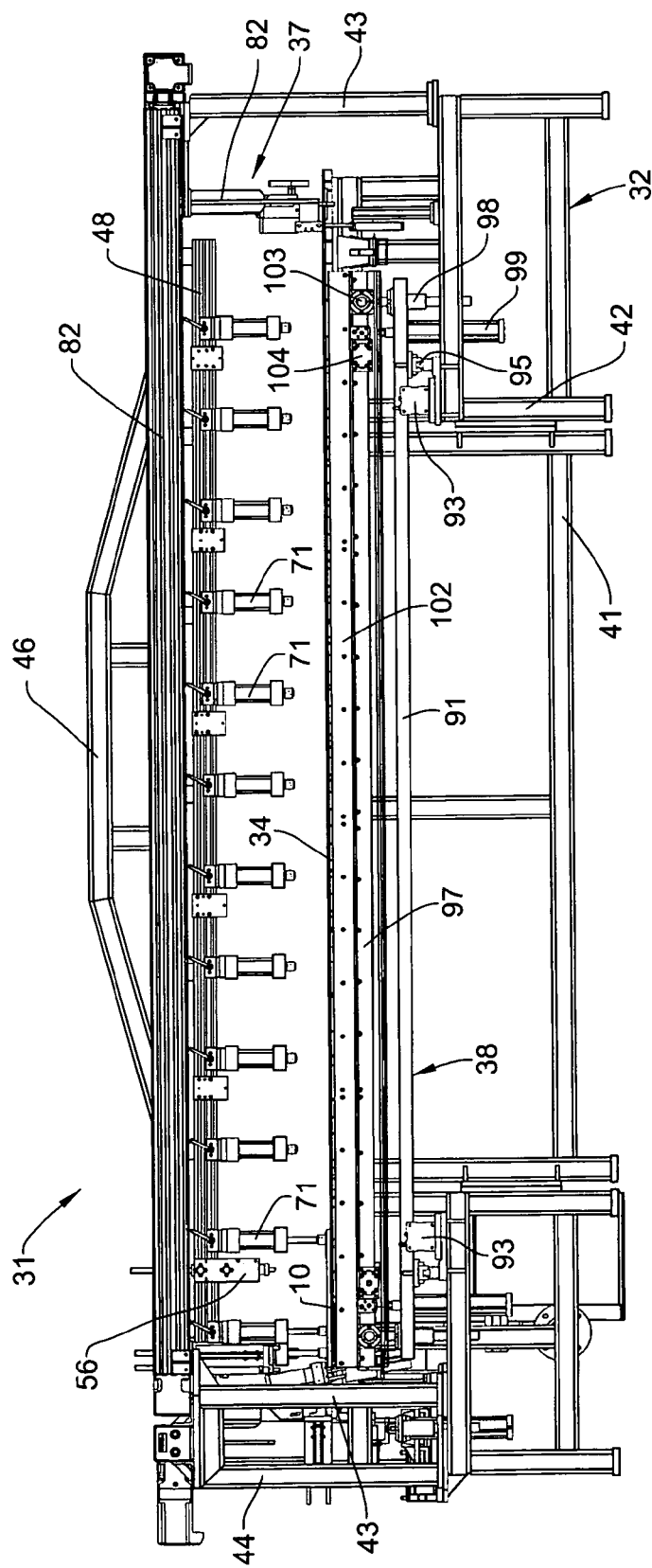
FIG. 4 is a back view of the apparatus as shown in FIG. 2.
Figure 5:
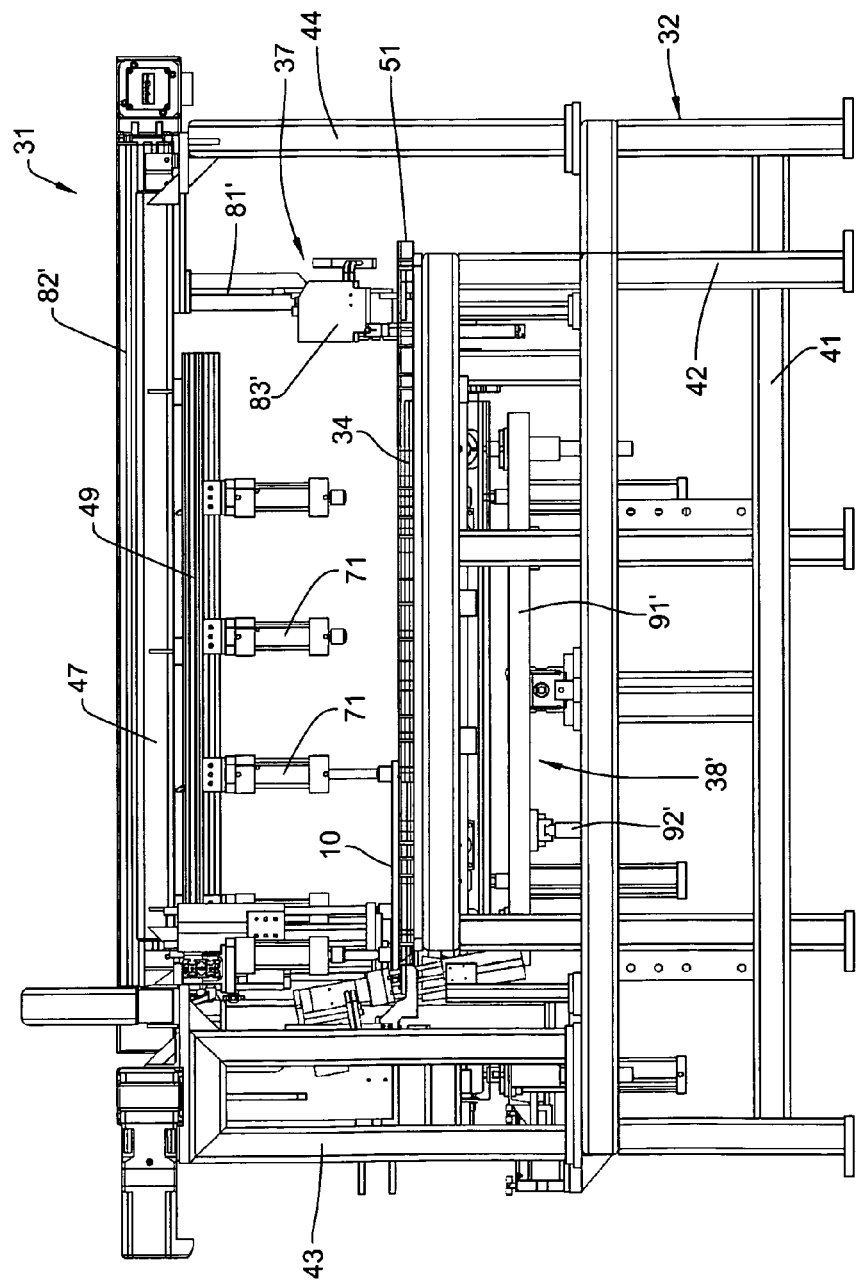
FIG. 5 is a left side view of the apparatus shown in FIG. 2.
Figure 6:
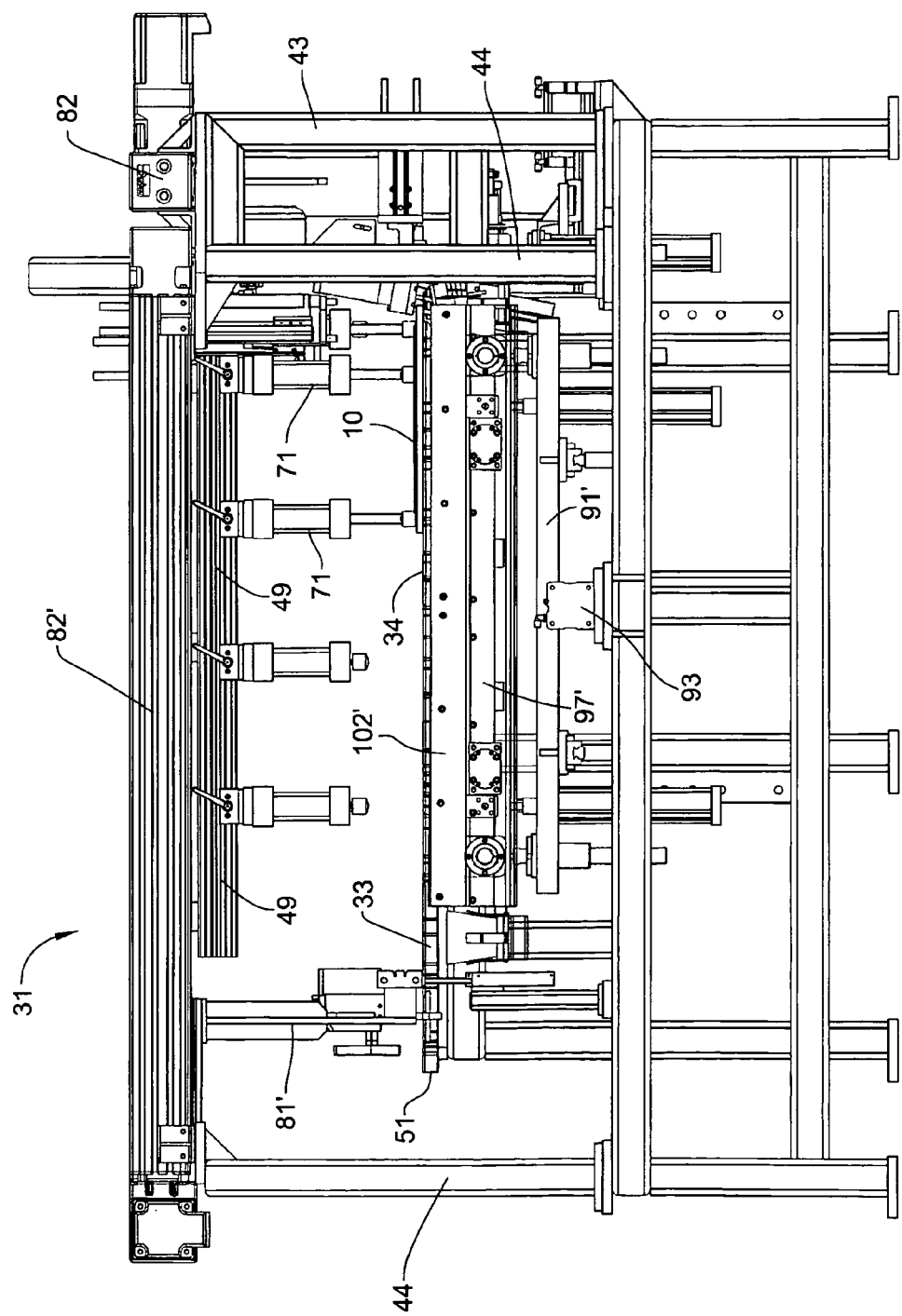
FIG. 6 is a right side view of the apparatus shown in FIG. 2.
Figure 7:
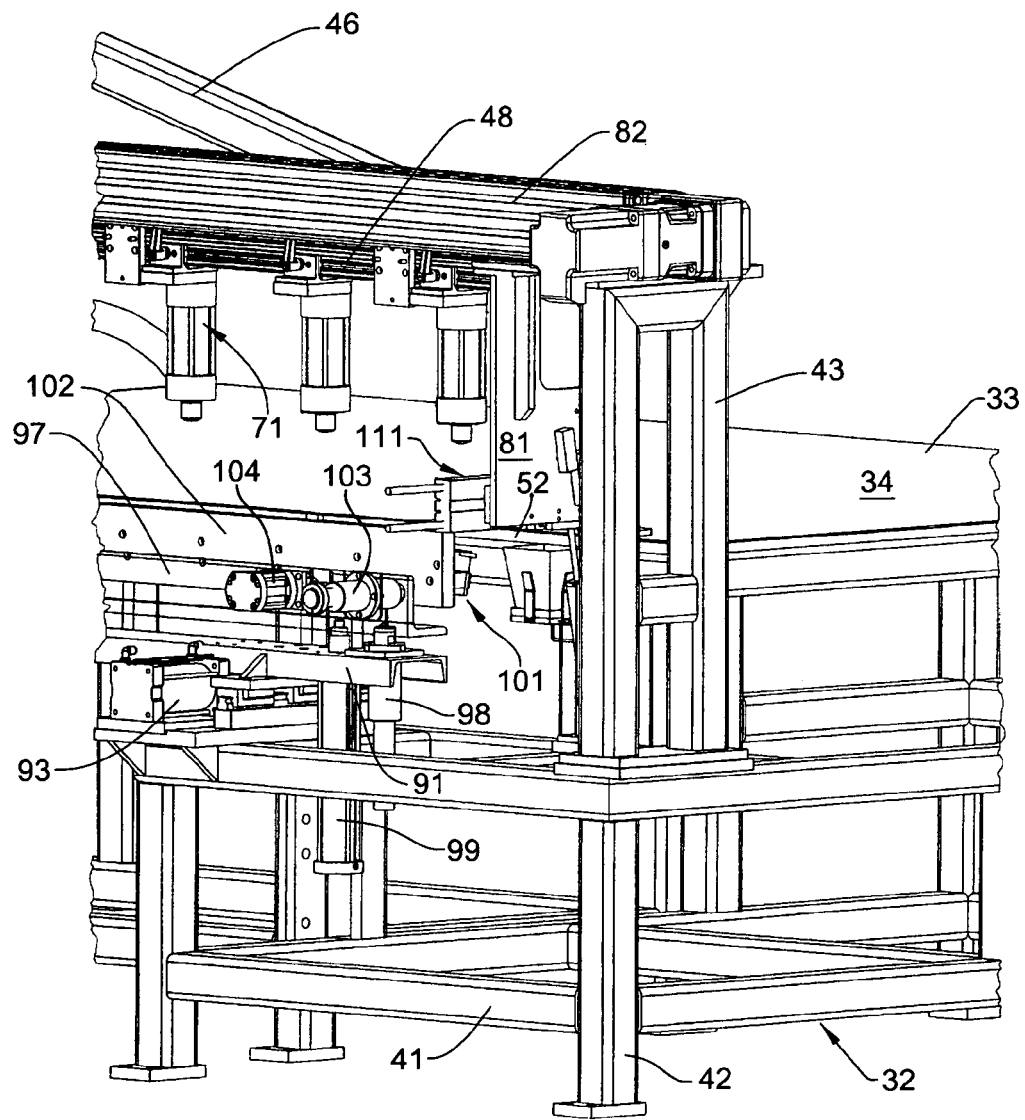
FIG. 7 is a fragmentary perspective view showing the left rear corner of the apparatus, and showing the wiping arrangement in a lowered position and the clamps in a retracted disengaged position.
Figure 8:
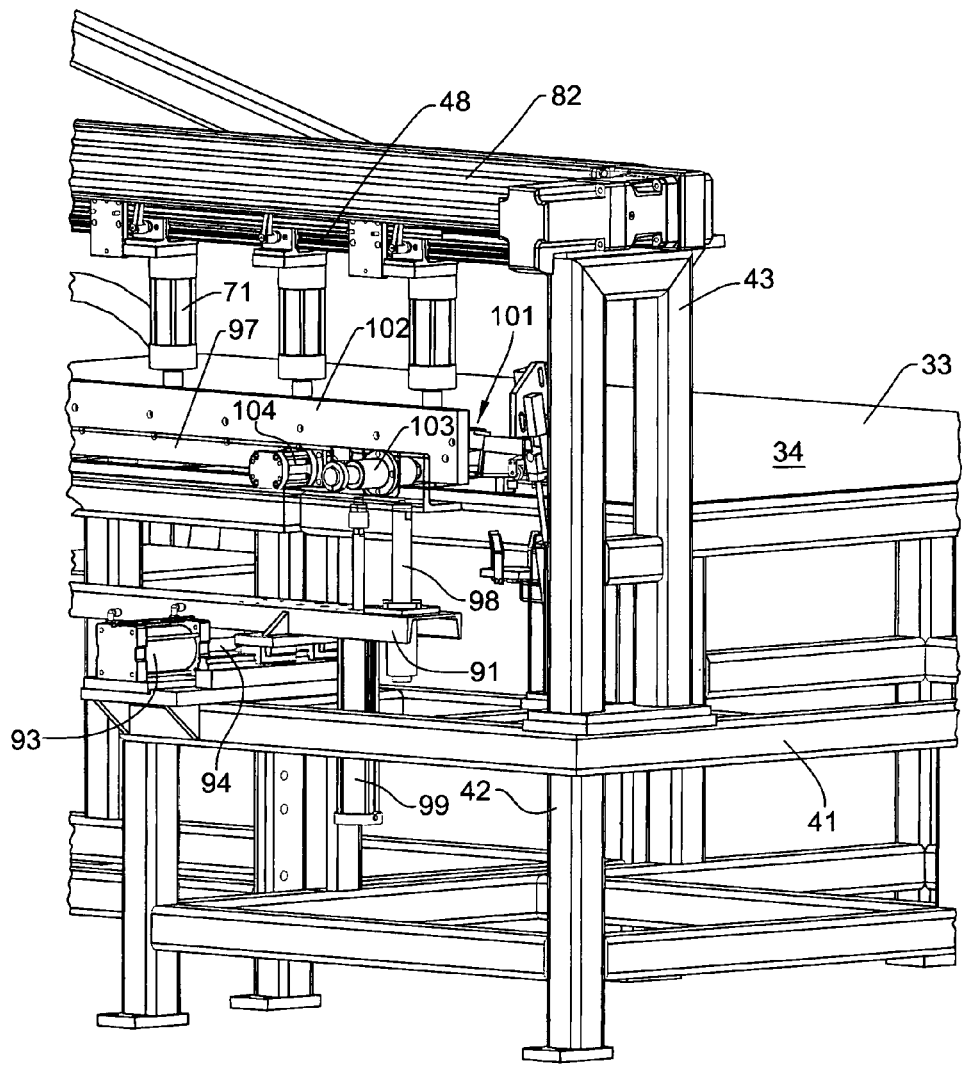
FIG. 8 is a view corresponding to FIG. 7 but showing the wiping apparatus in a raised activated position.

The apparatus 31, and specifically the clamping structure 36 associated therewith, includes a plurality of substantially identical clamping units 71 disposed in spaced relationship along the rear edge, which clamping units being secured to and suspended downwardly from the support rail 48 substantially as illustrated by FIG. 3. A further plurality of clamping units 71 are disposed in spaced relationship and are secured to and suspended downwardly from the other support rail 49 as illustrated in FIG. 5 so as to be positioned generally over the table in close proximity to the right table edge. The pressure cylinders associated with the plurality of clamping units 71 can all be simultaneously activated from a common pressure source through a common control system, although each cylinder also preferably has its own controllable shut-off valve so that only the desired number of cylinders, corresponding to the lengths of the workpiece edges, are activated during an operational cycle of the machine. For example, in the positional relationships illustrated by FIGS. 4 and 6, due to the small size of the workpiece and hence the rather short length of the frame edge rails, only two clamping devices are activated along the rear table edge, and similarly only two clamping devices are activated along the right table edge since the remaining clamping devices are outside the size or position of the workpiece.

To effect application of adhesive to the outwardly projecting cover sheet edge flaps (such as flap 24 in FIG. 10) when the workpiece is clamped to the table, a carrier structure 81 is connected to and suspended downwardly from a horizontally elongated driving unit 82 positioned adjacent and -parallel to the top beam 45, which driving unit 82 is supported on and extends between the upright structures 43. This driving unit 82 is of conventional construction and, within the elongate housing, includes a suitable driving member which traverses back and forth throughout the length of its surrounding housing and is coupled to the carrier structure 81 for moving it linearly back and forth throughout the length of the table generally along the length of the rear edge 52. The driving unit 82 may employ either an endless-type driving element such as a belt, or a rotatable screw for effecting linear displacement of a suitable drive nut which traverses lengthwise along the surrounding support housing.

Figure 11:
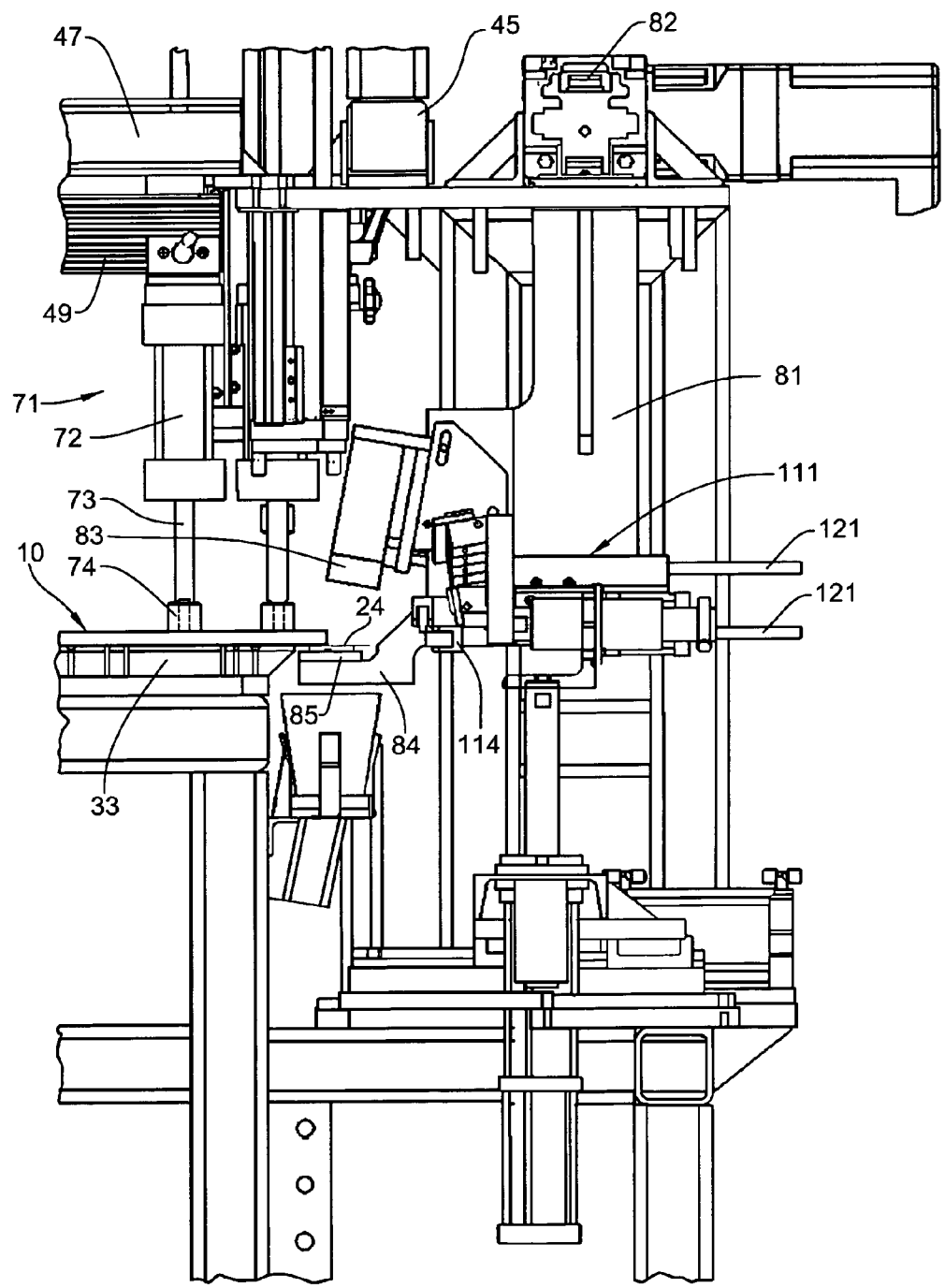
FIG. 11 is an elevational view taken generally in the plane designated 11-11 in FIG. 3 and shows the movable carrier and the adhesive spray system mounted thereon, and additionally shows the clamps engaged for holding the substrate against the support table.
Figure 12:
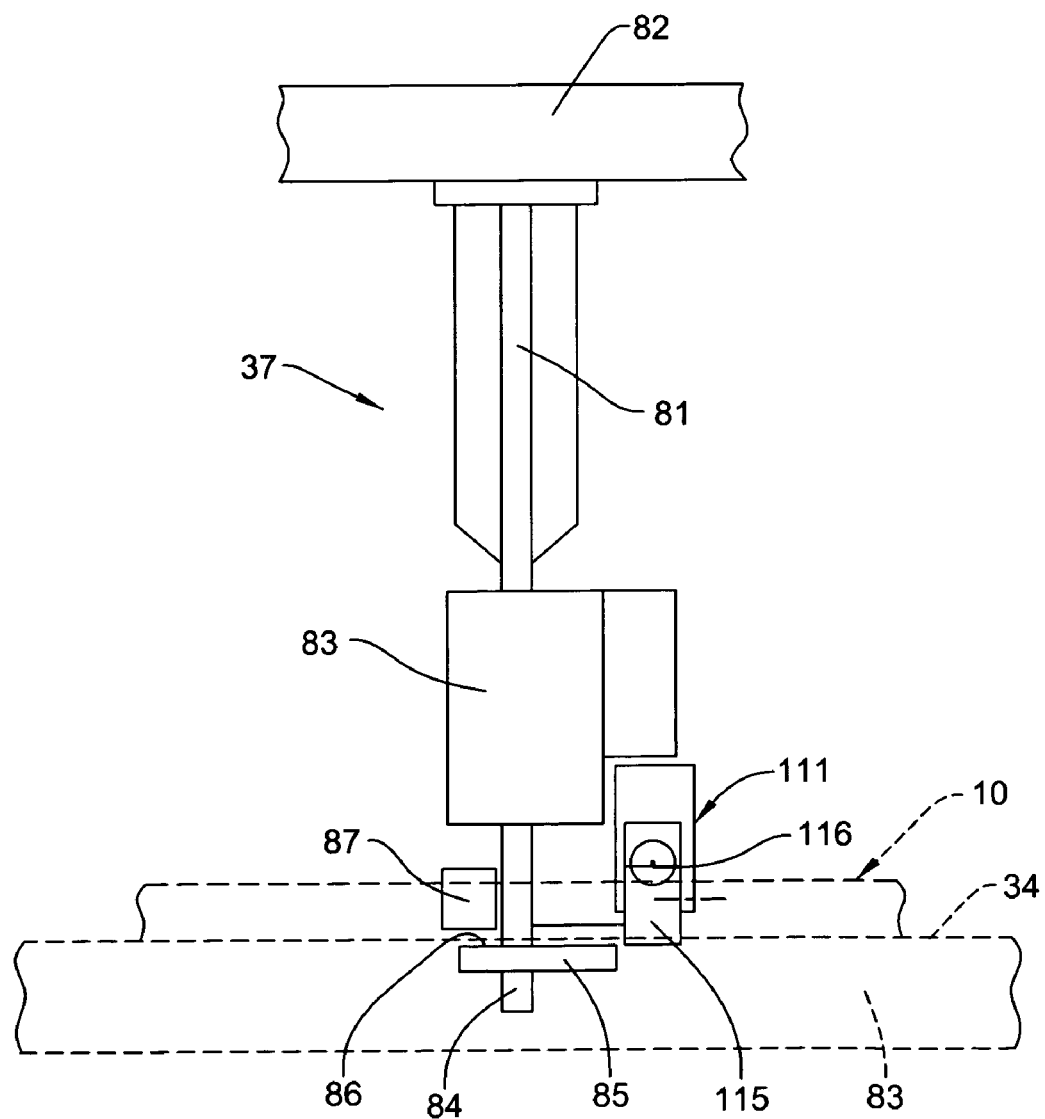
FIG. 12 is a diagrammatic elevational view showing a front side of the movable carrier and the components mounted thereon, specifically the adhesive spray system, the roller unit and a position sensor.

The carrier structure 81, as illustrated by FIGS. 11-12, is suspended downwardly from the overhead drive unit 82 and is positioned so that the lower end thereof is in reasonably close spatial relationship to the rear edge 52 of the table. The carrier structure 81 mounts thereon, adjacent the lower part thereof, the adhesive applicator arrangement 37 which includes a conventional spray device 83 which, when activated ejects a spray of adhesive patterned to coat not only the upward-facing back surface of the projecting edge flap 24 as illustrated in FIG. 10, but also the adjacent vertical edge face of the frame rail as well as the upward-facing back face of the frame rail to a point close to the projection 19 associated therewith. The spray system is conventional.

The carrier structure 81 includes, adjacent the lower free end thereof, an arm 84 which is cantilevered inwardly toward the rear edge 52 of the table. The arm 84 mounts thereon a support plate 85 having a generally horizontal upper surface 86 which is positioned directly adjacent the rear table edge 52 and disposed at an elevation closely adjacent but slightly below the elevation of the upper table surface 34. The support plate 85 and its planar upper surface 86 is sized so as to support the outwardly projecting edge flap over a selected length thereof, with this support plate 85 extending to a point located generally beneath the spray nozzle associated with the spray head 83. This hence provides underlying support for the flexible edge flap so as to prevent it from undesirably deflecting or bending downwardly due to the fluid pressure applied thereto when the spray head ejects a spray against the flap.

The carrier 81 also mounts thereon a position sensor 87 which is disposed adjacent one side of the spray head and is disposed to sense the presence of the workpiece mounted on the table as the carrier 81 is traversed lengthwise along the table edge by the drive unit 82. The sensor 87 causes deactivation of the spray head when it no longer senses the presence of the workpiece as the carrier traverses lengthwise along the table.

To effect folding and securing of the edge flap to the workpiece after the adhesive has been applied thereto by the spray head as briefly discussed above, the apparatus 31 is provided with the flap wiping arrangement 38 which is positioned adjacent the rear side of the table and extends lengthwise throughout the Length thereof. This wiping arrangement 38 includes a main support or carriage 91 which is positioned adjacent and spaced downwardly from the rear edge 52 of the table and is elongated in generally parallel relationship to the rear table edge. The carriage 91 is slidably supported on the frame by a pair of generally parallel guide rails disposed adjacent opposite ends of the carriage for enabling the carriage 91 to be linearly horizontally displaced in a direction which projects perpendicularly toward and away from the rear table edge. A pair of drive units 93, such as pressure cylinders, are mounted on the frame and have their piston rods coupled to the carriage 91 for effecting linear displacement of the carriage between a rearward retracted position (i.e. its home location) and a forward extended position wherein the carriage is disposed more closely adjacent the vertical plane defined by the rear table edge 52. The slidable support of the carriage 91 on the frame is further facilitated by a pair of generally parallel guide rods 95 which slidably cooperate between the carriage 91 and the frame.

The wiping arrangement 38 additionally includes a secondary carriage or support 97 which is movably supported above the main carriage 91 and extends lengthwise therealong through a length which generally corresponds to and is parallel with the rear table edge. This secondary carriage 97 couples to the main carriage 91 by a pair of generally parallel slide rod arrangements 98 which project vertically upwardly from the main carriage 91 adjacent opposite ends thereof and which enable the secondary carriage to be vertically linearly slidably displaced relative to the main carriage. A pair of generally parallel drive units, such as fluid pressure cylinders 99, are also drivingly coupled between the carriages 91 and 97 and, when activated, extend or retract the pressure rods thereof to effect appropriate vertical displacement of the carriage 97 upwardly or downwardly relative to the main carriage 91. The upward extension of the secondary carriage 97 is such as to enable this carriage to be moved from a lowered position wherein it is disposed below the elevation of the rear table edge, into a raised position wherein it is disposed at an elevation generally above the rear table edge.

The secondary carriage 97 mounts thereon a wiping unit 101 which includes a movable support 102 which is elongated throughout substantially the length of the secondary carriage 97, and which is supported on generally horizontally elongated guides 103 which project from the secondary carriage in a horizontal direction generally transverse or perpendicular to the adjacent rear table edge so as to permit the support 102 to be horizontally slidably displaced toward and away from the rear table edge. This movement of the support 102 is in turn controlled by a pair of generally parallel drive units 104, such as fluid pressure cylinders which are carried on the carriage 97 and have their piston rods coupled to the support 102 for horizontally slidably displacing the support 102 horizontally toward and away from the adjacent rear table edge.

The support 102 mounts thereon a first wiping blade 106 which extends horizontally substantially throughout the length of this support so as to have a length which corresponds generally to either the length of the table, or to the length of the longest workpiece which is to be positioned on the table. This wiping blade 106 is mounted so that it projects generally horizontally outwardly from the support in a direction toward the adjacent rear table edge, with the wiping blade as it is projected or cantilevered outwardly terminating in a free or tip end 107. This tip end 107 is preferably somewhat rounded, at least at the corners which extend lengthwise along the blade, so as to facilitate the engagement and sliding movement of the blade tip end across the flexible flap of the covering sheet.

The blade 106 is preferably constructed of a rather stiff elastomeric or rubber-like material which has limited flexibility and resiliency so that the tip end of the blade can be moved upwardly into contact with the outwardly projecting edge flap, with continued upward movement of the wiping blade 106 causing the tip end 107 to wipe upwardly across the edge flap and hence push the edge flap into snug adhesive contacting engagement with the edge face of the workpiece.

With respect to mounting of the blade 106 on the support 102, while the blade is elongated generally horizontally in parallel relationship to the table rear edge so as to permit upward wiping of the edge flap, nevertheless it is preferable to orient the blade so that it extends at a small angle or slope throughout the length thereof (that is, in a direction parallel with the rear table edge). By mounting the blade 106 with a slight slope from horizontal throughout the length thereof, this hence results in the blade making contact with the edge of the workpiece in a progressive manner along the length of the workpiece edge as the blade is moved upwardly, thereby minimizing the drag on the blade and the overall frictional drag imposed on the edge flap at any instant in time.

The wiping unit 101 also includes a second wiping blade 108 which is mounted on the support 102 at a location disposed downwardly from the blade 106. The blade 108 is also horizontally elongated generally throughout the length of the support and has a length which generally corresponds to the blade 106, and is oriented or cantilevered downwardly in a generally vertical orientation so as to terminate in a lower free or tip end 109 which is also preferably rounded similar to the tip end 107 of the blade 106. Blade 108 is also constructed of a material generally the same or similar to that of the blade 106 as described above. The tip end 109 of the blade 108 is oriented in a generally horizontal plane throughout the length thereof such that, when the support 102 is in a raised position following upward wiping of the edge flap by the first blade 106, the second blade 108 is at an elevation whereat the tip end 109 is substantially coplanar with or slightly below the elevation of the upward-facing back face of the edge rail 13 so that inward movement of the blade 108 effects engagement with the upper tip portion of the edge flap, causing the latter to be folded down and wiped into secure engagement with the upper-facing back face of the frame edge rail. The configuration of the blade permits, however, the flap to be folded down and pressed into secure adhesive engagement with the back face of the edge rail up to a location closely adjacent the edge rail protrusion 19.

After the edge flap has been folded and moved into adhesive engagement with the edge and back faces of the workpiece edge frame as described above, then a flap pressing arrangement 111 is activated so as to rollingly engage the parts of the edge flap engaged with both the edge and back faces of the workpiece so as to insure secure adhesive contacting engagement therewith. The flap pressing arrangement 111 comprises a roller unit which is carried on the carrier structure 81 so that the roller unit can be rollingly engaged with and move along the edge of the workpiece as the carrier structure moves lengthwise along the rear edge of the table.

The pressing arrangement or roller unit 111 includes a driving unit such as a fluid pressure cylinder 112 disposed with its housing mounted to the carrier structure 81 at a location adjacent the lower end thereof, with the pressure cylinder 112 oriented so that its piston rod projects outwardly generally horizontally toward the opposed rear edge surface of the table. The piston rod couples to roller unit housing 114 which is horizontally slidably supported on a pair of generally parallel but vertically spaced guide rods 121 which project horizontally from the carrier structure in generally perpendicular relationship to the opposed table edge so as to slidably support the roller unit housing for slidable movement toward and away from the opposed table rear edge and hence toward and away from the edge of the workpiece supported on the table. The roller unit housing supports thereon a pair of rollers namely a lower or side roller 116 which is disposed for rotation about a generally vertical axis and is positioned at an elevation for rolling engagement with the side edge of the workpiece frame over substantially the full width thereof. The roller unit housing also mounts thereon a second or top roller 117 which is disposed at an elevation above and outwardly from the lower or side roller 116. The top roller 117 is disposed with its rotational axis extending horizontally in generally perpendicular relation to the lengthwise extending direction of the table rear edge. The lower edge or contact point for the top roller tread is disposed at an elevation or plane which generally corresponds to the upper extremity of the cylindrical side roller 116 so that the top roller 117 hence is positioned for engaging and pressing the edge portion of the edge flap into secure gripping engagement with the upwardly-facing back face of the edge frame. The roller 117 is capable of rolling along this surface so as to be disposed in close relationship to and rolling contact along the surface in close proximity to the upwardly protruding rib or protrusion 19.

In the apparatus 31 of this invention, the table 33 is preferably provided with a plurality of small openings extending vertically therethrough and dispersed somewhat uniformly over the surface thereof. These openings preferably communicate with a plenum chamber defined below the table, the latter being connected to a conventional pressurized air source so as to permit selective supply of air to the plenum and thence upwardly through the openings to the upper surface of the table to create a partial air cushion when a workpiece is supported on the table. Since the workpiece supported on the table is disposed with the covering sheet facing downwardly, the air cushion hence minimizes the contact pressure and hence the frictional engagement between the cover sheet and the upper table surface, thereby not only facilitating operator movement of the workpiece relative to the table, but also minimizing contact and hence potential abrasive engagement between the table surface and the cover sheet.

While the apparatus 31 as described above has related principally to the components which cooperate with the rear table edge 52, namely the flap wiping arrangement 38 and the adhesive applicator 37 which cooperate with the edge of the workpiece disposed along the rear table edge 52, it should be noted that the apparatus 31 also includes corresponding structures associated with the front or right table edge 53 so as to permit wrapping of an edge flap along a second edge of the workpiece. More specifically, the apparatus 31 has a generally similar wiping apparatus 38' associated with the front or right table edge 53, and also has a carrier structure 81' which traverses lengthwise along the right table edge and carries thereon a spray head assembly and a roller unit similar to those carried on the carrier structure 81 so as to permit adhesive application, folding and securement of an edge flap along the rightward edge of the workpiece as positioned on the support table.

Operation

The operation of the apparatus 31 will now be described to insure a complete understanding thereof. In the following, the operational description will relate to the functions carried out with respect to a workpiece of the type illustrated in FIGS. 18 and 20, namely a workpiece having a covering sheet attached to the front face thereof and having flexible edge flaps projecting outwardly from all four edges thereof, with the apparatus 31 and its operational sequence resulting in folding and securement of the edge flap to the edge frame in the positional relationship illustrated by FIG. 19.

Prior to initiation of an operational cycle, the machine 31 will be in a standby condition wherein the flap wiping arrangements 38 and 38' will be disposed in their lowered and retracted positions, the carrier structures 81 and 81' (and the adhesive heads and roller units carried thereon) will be maintained in their home positions which are disposed adjacent the ends of the respective table edges which are remote from the positioning corner (i.e. the right rear corner) of the table, and the clamping units 71 and the positioning structure 35 will be maintained in their raised retracted positions.

To initiate a cycle of operation, the activating cylinders 57 associated with the positioning structure 35 are energized so that the positioning pins 61, 62 and 63 are lowered downwardly into their lowermost position wherein they are positioned adjacent and outwardly from the respective edges 52, 53 of the table 73 substantially as illustrated in FIG. 9A. When the locating pins are in their lowered position, a workpiece 10 is then positioned on the support table 33 so that the cover sheet 21 thereon faces downwardly so as to be substantially in contact with the top surface of the table. The workpiece is either manually or mechanically moved into proper position adjacent the positioning corner of the table so that the perpendicular edge frame members 13, 14 on the workpiece overhang the respective rear and right edges 52, 53 of the table and move into positioning contact with the three locating pins 61-63 substantially as illustrated in FIG. 9A, thereby providing for proper location and alignment of the workpiece on the table. The movement of the workpiece into engagement with the positioning pins occurs with the edge flaps projecting outwardly in generally cantilevered relationships, which edge flaps are permitted to pass beneath the positioning pins 61-63 due to the latter having their lower surfaces disposed at an elevation slightly above the elevation of the work table surface.

The appropriate clamping devices 71 associated with both the rear and right edges of the table are then energized so as to move the respective clamping pads downwardly into contacting and clamping engagement with the perpendicular frame members associated with the workpiece so as to effectively clampingly hold the workpiece on the support table in the desired position. Once the clamps 71 have securely engaged and fixedly positioned the workpiece on the table, then the pressure cylinders associated with the positioning structure 35 are reversely energized so that the positioning pins 61-63 are moved upwardly back into their retracted positions.

The elongate linear drive unit 82 associated with the rear edge of the table is then energized to cause the carrier structure 81 to be rapidly moved lengthwise along the rear table edge from its home position into a reversing position disposed adjacent the other end of the rear edge, namely adjacent the right rear corner of the table. When the carrier structure 81 is stopped at the reversing position, which stoppage is controlled by an appropriate position sensor, the spray head 83 is positioned so that it is disposed generally directly over the protruding edge flap 24 directly adjacent the corner cutout 26. The elongate drive unit 82 is then reversely energized so as to rapidly return the carrier structure 81 back to its home position. During this return movement, the spray assembly 83 is energized so as to spray adhesive onto the back surface of the outwardly projecting edge flap, and also onto the vertical edge face and upwardly-facing back face of the edge rail as the spray head traverses lengthwise along the workpiece. During this spraying and traversing operation, the support plate 85 is positioned under the outwardly protruding edge flap at a location generally under the spray zone so as to prevent the edge flap from being downwardly deflected due to the fluid pressure imposed thereon by the spraying process. During the return traversing movement of the carrier structure 81 along the rear edge, the sensor 87 carried thereon senses when it moves past the end of the workpiece (i.e. the end remote from the right rear positioning corner) and deactivates the spray assembly so that the spray head terminates the discharge of adhesive at the point in time when it moves past the end of the edge flap being sprayed. The carrier structure 81 continues its retracting traversing movement back to its home position, and then stops and is maintained in this position.

Figure 13:
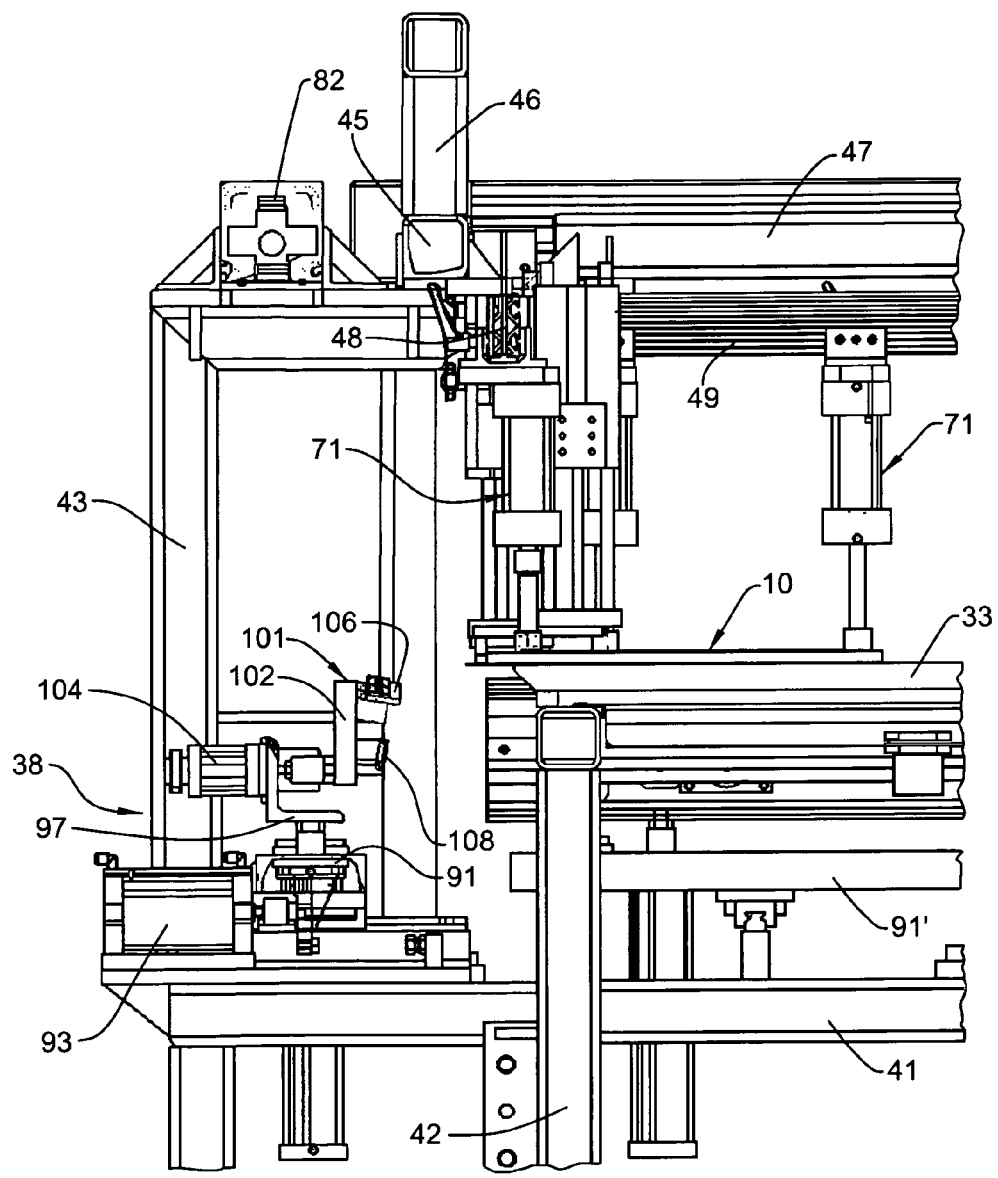
FIG. 13 is an elevational view taken generally along the plane designated 13-13 in FIG. 3 and showing the wiping assembly in its lowered home position relative to the table.
Figure 14:
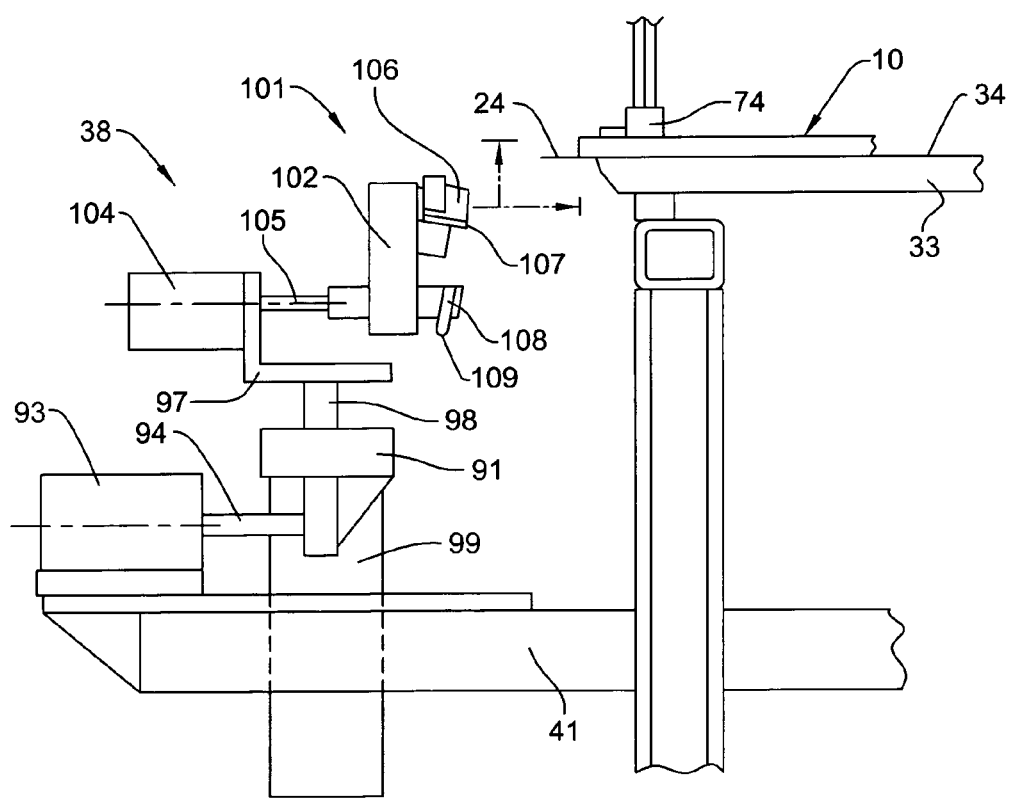
FIG. 14 is a diagrammatic elevational view which illustrates the wiping assembly relative to the table.
Figure 15:
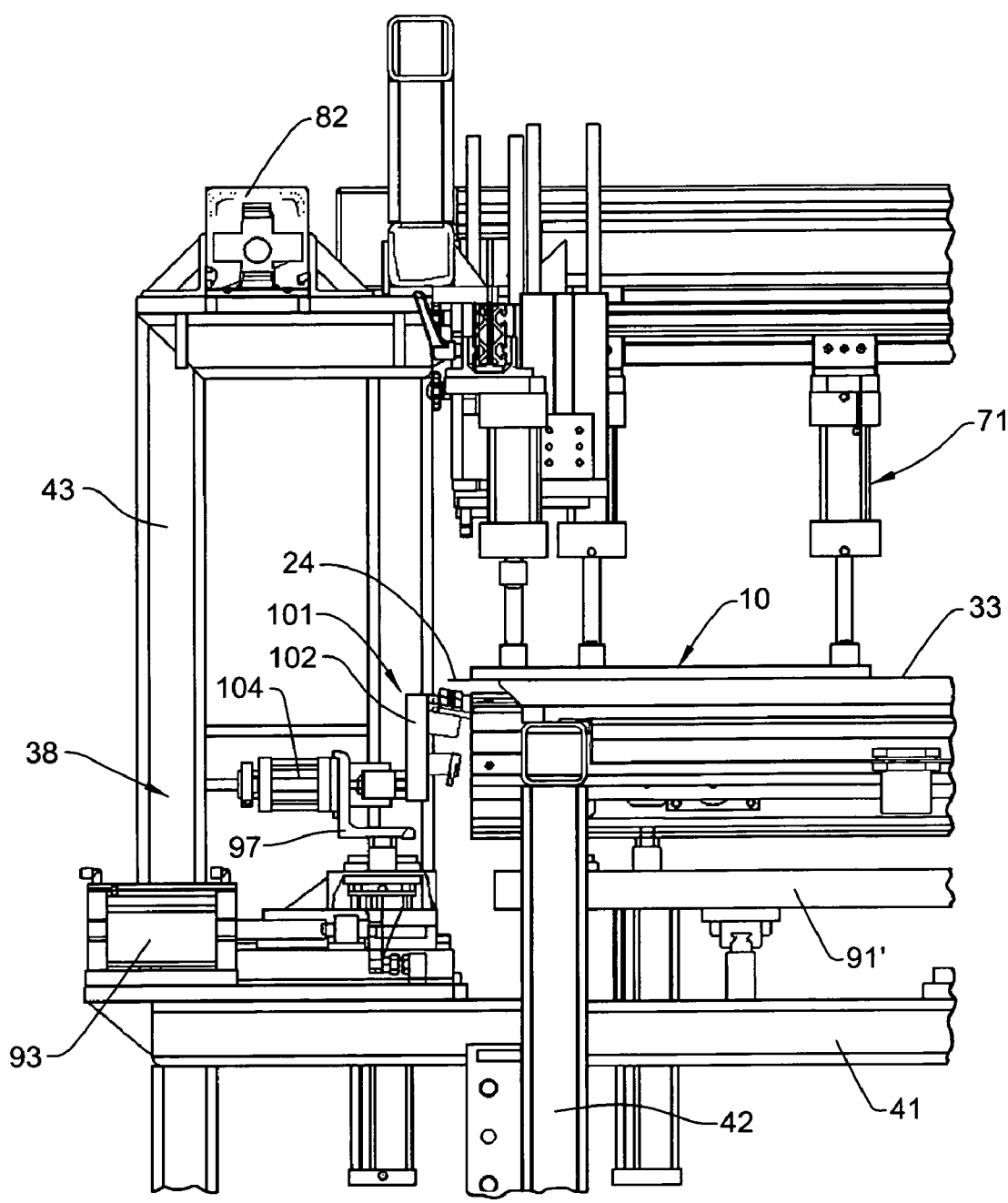
FIG. 15 is a view similar to FIG. 13 but showing the wiping assembly in its inwardly activated but lowered position.
Figure 16:
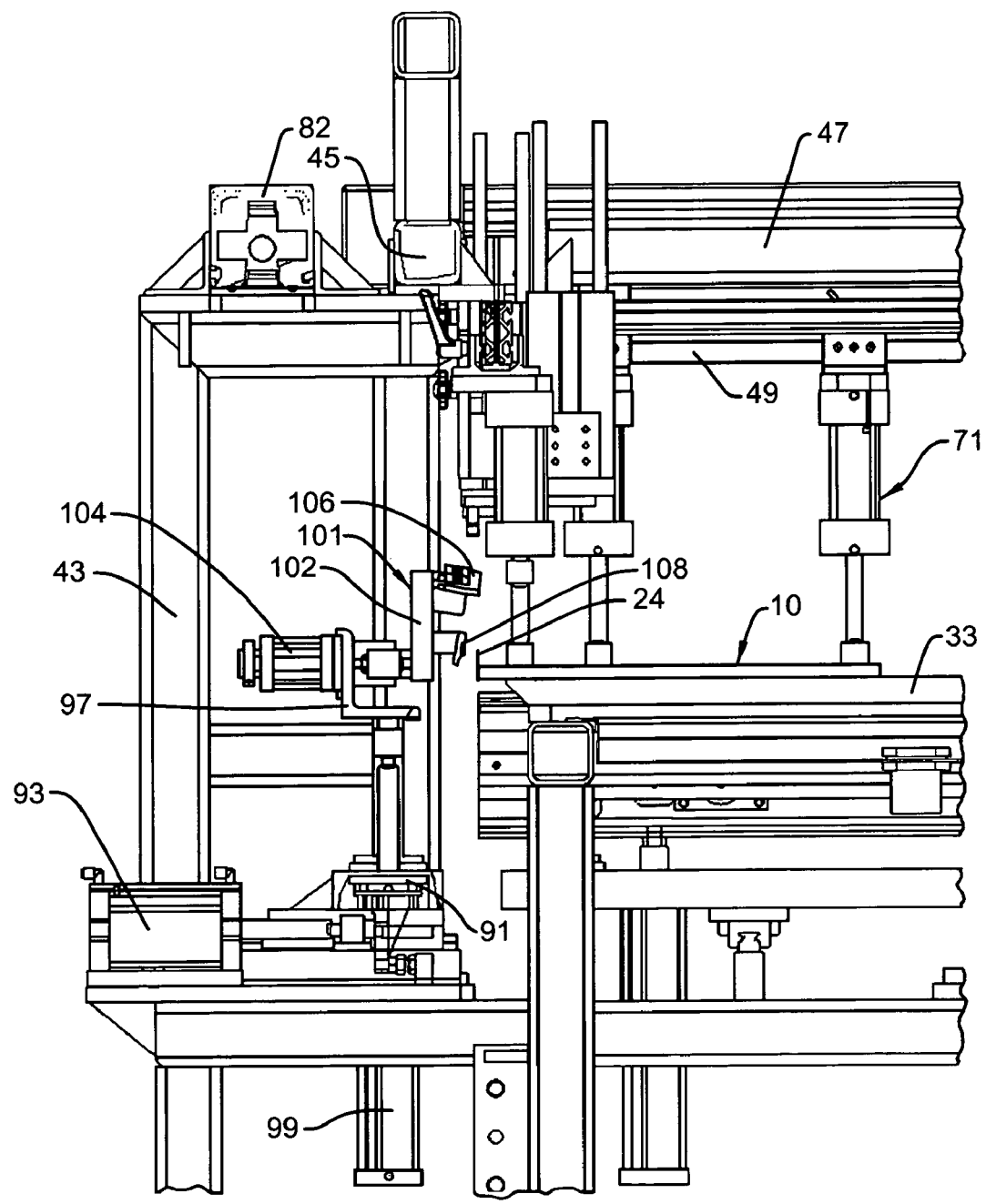
FIG. 16 is a view corresponding to FIG. 15 but shows the wiping assembly in its raised position after the horizontal wiping blade has wiped the edge flap upwardly into contact with the edge face of the substrate.
Figure 17:
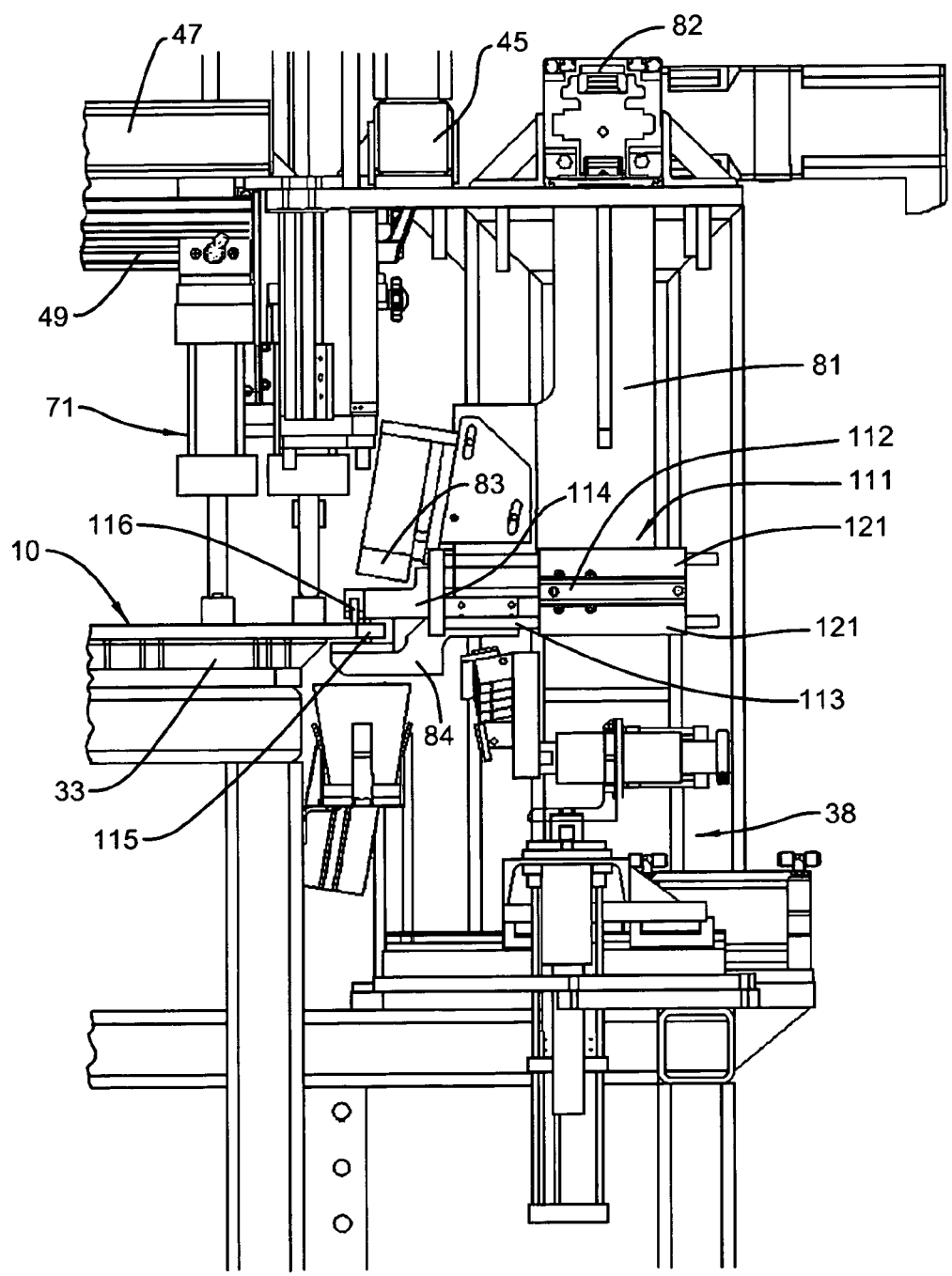
FIG. 17 is a view similar to FIG. 11 but showing the roller assembly in its activated (i.e. extended) position for rolling the edge flap into secure engagement with the edge and back faces of the substrate frame.

The wiping arrangement 38 associated with the rear table edge is then activated. Initially the drive cylinders 93 are energized so as to displace the main carriage 91 horizontally inwardly from the retracted position of FIG. 13 into the advanced position of FIG. 15. In this latter position the tip 107 of the upper wiping blade 106 is disposed generally at or slightly beyond a vertical plane defined by the vertical edge face of the workpiece. The secondary carriage 97 is then displaced upwardly by energization of the drive cylinders 99, whereupon the upper wiping blade 106 moves upwardly into contact with the outwardly protruding edge flap 24, with the continued upward movement of the blade 106 causing the edge flap as illustrated in FIG. 15 to be deflected or bent upwardly and pressed into contact with the edge face of the workpiece frame. The upward movement of the secondary carriage 97 and the wiping blades carried thereon continues until the top wiping blade 106 is moved upwardly past the upwardly protruding edge flap, which flap now has an edge part thereof projecting upwardly above the upward-facing back face of the frame rail on the workpiece. The upward motion of the secondary carriage 97 continues until the tip 109 of the lower wiping blade 108 is disposed substantially at an elevation corresponding to the upwardly-facing back face of the frame rail. The upward motion of secondary carriage 97 is then stopped, and the pressure cylinders 104 are energized so that the blade support 102 is moved horizontally inwardly toward the workpiece. This causes the lower blade 108 to contact the upwardly cantilevered edge part of the edge flap and fold it downwardly onto the upward-facing back surface of the rail, with the tip 109 of the blade 108 engaging the folded down edge part of the flap and wiping it into snug engagement with the back face of the rail. The inward movement of the blade 108 continues until the tip thereof is disposed adjacent the edge of the flap, and adjacent the upward protrusion 19 on the frame rail. The inward motion of support 102 is then stopped, whereupon pressure cylinders 99 are again upwardly activated to cause the secondary carriage 97, and the support 102 carried thereon, to be vertically lifted a small distance so that blade 108 moves upwardly out of engagement with the workpiece. Pressure cylinders 104 are then reversely energized to retract the blade support 102 away from the workpiece and back towards its original retracted position. Once the blades have retracted sufficient to clear the workpiece, then the drive cylinders 83 and 93 are reversely energized to return the secondary carriage 97 back to its lowered position, and to horizontally retract the primary carriage 91 back to its retracted home position.

The elongate drive unit 82 is again energized to move the carrier structure 81 lengthwise along the full length of the rear table edge until reaching its reversing position, whereat it is stopped. In this stopped position, as disposed adjacent the positioning corner (i.e. the right rear corner) of the table, the retracted flap pressing roller arrangement 111 is positioned adjacent but just past the end of the workpiece edge frame. The pressure cylinder 112 associated with the roller unit 111 is energized so that the roller unit is projected outwardly into an extended position wherein the rollers are now generally aligned with the end of the adjacent workpiece. The drive unit 82 is then reversely energized to movably traverse the carriage unit backwardly along the rear edge of the table until reaching its home position. During this retracting traverse of the carriage structure 81, the rollers 116, 117 associated with the roller unit engage the folded edge flap so as to press the flap securely against both -the vertical edge face as well as the up-facing back face of the frame rail, thereby insuring that the flap is adhesively pressed into secure contacting engagement with the frame rail. When the roller unit leaves engagement with the workpiece following its traversal along the table, the pressure cylinder 112 again retracts the roller unit back to its storage position.

Following completion of the edge wrapping operation along the rear edge of the table as described above, then the same edge wrapping operation is carried out by the corresponding structures associated with the front or right edge of the table. When this second edge wrapping operation has been completed, then the clamps 71 are reversely activated so as to lift the clamping pads away from the workpiece, whereupon the operator then moves the workpiece away from its clamping position on the table. The positioning arrangement is then again activated so that all of the positioning pins 61-63 are again moved into their lowered position so as to permit a further edge wrapping operation to be carried out.

As to the next successive edge wrapping operation, this may involve the operator rotating the previously treated workpiece and rotating it 180 degrees and repositioning it in engagement with the positioning pins so as to permit the remaining two edge flaps to be wrapped and secured. Alternately, the operator may remove the workpiece from the table and provide a wholly new workpiece for use in the next edge wrapping operation.

Summarizing the process of the present invention, as carried out on the apparatus 31 as briefly described above, there is initially provided a panel-like workpiece having a flexible covering sheet positioned to extend across the front face thereof, and having flexible edge flaps which are cantilevered outwardly beyond one or more of the workpiece edges. The workpiece is positioned on an upper surface of a support so that the covering sheet faces downwardly. The workpiece is positioned in engagement with positioning structure so that at least one edge of the workpiece horizontally overhangs an edge of the support, and the edge flap associated with that edge of the workpiece is cantilevered generally outwardly away from the workpiece. The workpiece is clamped to the support in the noted position, and an adhesive applicator is moved lengthwise along the overhanging edge of the workpiece so as to apply, specifically spray, adhesive onto the back side of the projecting flap as well as on the exposed adjacent surfaces defining the edge and part of the back face of the workpiece. The flap is preferably supported from beneath by a support which moves beneath the flap in the vicinity of the adhesive applicator to prevent downward sagging of the flap as a result of the adhesive application thereto. A flap wiping apparatus is then moved upwardly past the overhanging edge and a first deflectable blade is moved upwardly to engage the flap, which blade deflects the flap upwardly and presses it into contact with the edge face of the workpiece as the blade continues its upward movement. A second deflectable blade is then moved inwardly so as to deflect the upwardly protruding portion of the flap downwardly and to press this flap portion into secure contacting engagement with the upwardly-facing back face of the workpiece. The second blade is capable of moving to a position generally adjacent the free edge of the flap, which position can be disposed closely adjacent a protrusion which juts upwardly from a back side of the workpiece. The wiping apparatus is then lifted and retracted and returned to its lowered position, and thereafter a roller unit is preferably disposed adjacent one end of the edge, with rollers engaging both the edge and back faces over the previously folded flap. The roller unit is then moved lengthwise along the edge of the workpiece to ensure proper adhered engagement of the flap to the workpiece throughout the entire extent of the flap. The clamps are then disengaged from the workpiece, and the workpiece removed from its overhanging position on the support.

With respect to the wiping blades 106 and 108, in a preferred construction the blade 108 is preferably provided with a material having a durometer or stiffness which is somewhat greater than the durometer of the blade 106, such as a durometer of 70 for blade 108 and a durometer of 50 for blade 106. The somewhat greater stiffness of the blade 108 reduces the blade deflection and hence facilitates the movement of the blade into close positional relationship to the protruding rib 19.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A process for wrapping an edge of a panel-shaped substrate, comprising the steps of:
   providing a workpiece defined by a panel-shaped substrate having first and second pairs of generally parallel edge faces which extend generally perpendicular to one another, and a thin flexible cover sheet positioned in overlying relationship to a front face of said substrate and having a flexible edge flap associated with each of said edge faces and extending along and protruding outwardly beyond the respective edge face;
   providing a support defining an upwardly-facing top surface adapted for supporting said workpiece thereon;
   positioning said workpiece on said support so that the flexible cover sheet thereof faces downwardly and is disposed in overlying relationship to said top surface;
   locating said workpiece on the support in cooperating engagement with a positioning arrangement associated with the support so that said workpiece along a first one if the edge faces extending lenthwise thereof horizontally overhangs a respective adjacent first edge of the top surface and a first one of the edge flaps protrudes generally horizontally outwardly from said first one of the edge faces;
   clamping said workpiece fixedly on the support in a position determined by the positioning arrangement;
   applying adhesive to an upwardly-facing back side of said first one of the edge flaps throughout a length thereof;
   providing an edge flap wrapping arrangement positioned adjacent said first edge of said top support and including first and second stiff but resilient wiping blades which extend lengthwise along said first edge, said first wiping blade projecting generally horizontally toward said first edge and terminating at a tip end, and said second wiping blade projecting generally vertically downwardly and terminating at a lower tip end;
   moving said edge flap wrapping arrangement upwardly adjacent said first edge of said top surface so that said first wiping blade contacts and deflects said first one of the edge flaps upwardly and the tip end of said first wiping blade wipes upwardly of the first one of the edge flaps and presses the first one of the edge flaps into contact with the first one of the edge faces of the workpiece;
   continuing upward movement of said first wiping blade until the first wiping blade moves upwardly out of engagement with the first one of the edge flaps;
   then moving the second wiping blade generally horizontally inwardly so that the second wiping blade contacts an upwardly protruding upper edge part of the first one of the edge flaps and deflects the first one of the edge flaps downwardly over an upwardly-facing back face of said workpiece and the lower tip end presses the edge part of the first one of the edge flaps into contact with the back face;
   then returning the edge flap wrapping arrangement back to a retracted position spaced from said workpiece.

2. A process according to claim 1, including the steps of:
   providing a roller unit having roller surfaces positioned for lengthwise rolling engagement with both the first one of the edge faces and the back face of said workpiece; and
   after the edge flap wrapping arrangement has been moved to the retracted position, engaging said roller unit with said first one of the edge faces and the back face of said workpiece, and rollingly moving the roller unit lengthwise along the first one of the edge faces and the back face of said workpiece to effect pressing of the first one of the edge flaps against the first one of the edge faces and the back face.

3. A process according to claim 1, including the steps of:
   providing a workpiece positioning structure movable between a raised retracted position relative to the support and a lowered active position wherein the positioning arrangement is disposed sidewardly adjacent and spaced outwardly a small horizontal distance from the first edge of the top surface to permit said workpiece to be abutted thereagainst so that the first one of the edge faces thereof horizontally overhangs the first edge of the top surface, said workpiece positioning structure when in said lowered active position being at an elevation at least slightly above the top surface of the support so that the first one of the edge flaps projects outwardly below the positioning arrangement; and
   moving said workpiece positioning structure into said raised retracted position after said workpiece has been clamped to said support.

4. A process according to claim 3, including the steps of:
   providing a roller unit having roller surfaces positioned for lengthwise rolling engagement with both the first one of the edge faces and the back face of said workpiece; and
   after the edge flap wrapping arrangement has been moved to the retracted position, engaging said roller unit with said first one of the edge faces and the back face of said workpiece, and rollingly moving the roller unit lengthwise along the first one of the edge faces and the back face of said workpiece to effect pressing of the first one of the edge flaps against the first one of the edge faces and the back face.

5. A process according to claim 3, including the steps of:
   providing the positioning arrangement with first and second positioning elements which, in said lowered active position, are disposed adjacent and outwardly from respective first and second perpendicular edges of the support so that edge faces of said workpiece that are perpendicular overhang the perpendicular of the support when said workpiece is engaged with the first and second positioning elements;
   applying adhesive to a back side of a second one of the edge flaps associated with the second perpendicular edge of the support; and providing a second wrapping arrangement positioned adjacent and extending along the second perpendicular edge of the support and including first and second wiping blades corresponding to the first and second wiping blades associated with said edge flap wrapping arrangement; and after said edge flap wrapping arrangement retracts from said workpiece, moving said second wrapping arrangement upwardly adjacent said second perpendicular edge of the support so that the first wiping blade thereof deflects and presses the second one of the edge flaps associated with the second perpendicular edge into contact with second one of the edge faces, and then moving the second wiping blade horizontally inwardly to deflect and wipe an edge part of the second one of the edge flaps associated with the second perpendicular edge downwardly into engagement with the back face of said workpiece.

6. A process according to claim 5, including the steps of:

following completion of the edge wrapping of the first and second edge flaps on said workpiece as defined above, then releasing said workpiece from the support, rotating said workpiece horizontally 180 degrees relative to the support, then repositioning said workpiece in engagement with the positioning elements and clamping said workpiece to the support, and then applying adhesive to the back surfaces of remaining ones of the flaps and then wrapping remaining ones of the edges of said workpiece following the same process steps defined above.

* * * * *

UNITED STATES PATENT AND TRADEMARK OFFICE
CERTIFICATE OF CORRECTION

PATENT NO. : 8,282,760 B2  
APPLICATION NO. : 12/802611  
DATED : October 9, 2012  
INVENTOR(S) : Ronald H. Brown et al.

It is certified that error appears in the above-identified patent and that said Letters Patent is hereby corrected as shown below:

Column 17, line 43; change "if the edge faces" to -- of the edge faces --

Column 19, line 14; change "with second one" to -- with a second one --

Signed and Sealed this
Twelfth Day of February, 2013

Teresa Stanek Rea
*Acting Director of the United States Patent and Trademark Office*